United States Patent [19]
Bradt et al.

[11] Patent Number: 4,839,505
[45] Date of Patent: * Jun. 13, 1989

[54] APPARATUS AND METHOD FOR STORING AND RETRIEVING ARTICLES

[75] Inventors: L. Jack Bradt; Robert L. Brown; G. Stephen Fogt, all of Easton, Pa.; Ron Laroy, Rockaway, N.J.; Allen R. Lewis, Easton, Pa.; James S. Love, Newport News, Va.

[73] Assignee: Videomat Associates, Easton, Pa.

[*] Notice: The portion of the term of this patent subsequent to Mar. 21, 2006 has been disclaimed.

[21] Appl. No.: 53,380

[22] Filed: May 22, 1987

Related U.S. Application Data

[63] Continuation-in-part of Ser. No. 868,815, May 29, 1986, Pat. No. 4,814,592.

[51] Int. Cl.⁴ .................. G06F 15/24; G11B 17/26
[52] U.S. Cl. ........................... 235/381; 235/383; 364/479; 369/34; 360/92; 221/88
[58] Field of Search ............ 235/375, 380, 381, 382.5, 235/385, 383, 487, 488; 360/91, 92, 69, 132, 137; 364/478, 479; 340/825.35; 369/34, 36, 37; 221/81, 88, 2, 5

[56] References Cited

U.S. PATENT DOCUMENTS

| | | | |
|---|---|---|---|
| 3,938,190 | 2/1976 | Semmlow et al. | 360/69 |
| 4,414,467 | 11/1983 | Gould et al. | 235/380 |
| 4,458,802 | 7/1984 | Maciver et al. | 221/81 |
| 4,519,522 | 5/1985 | McElwee | 364/479 |
| 4,598,810 | 7/1986 | Shore et al. | 235/381 |
| 4,602,299 | 7/1986 | Saito | 360/132 |
| 4,668,150 | 5/1987 | Blumberg | 221/88 |

FOREIGN PATENT DOCUMENTS

| | | | |
|---|---|---|---|
| 1207411 | 7/1986 | Canada | 235/494 |
| 0191636 | 8/1986 | European Pat. Off. | 221/88 |
| 86/02758 | 5/1986 | World Int. Prop. O. | 221/81 |

OTHER PUBLICATIONS

Creditron, "Join The Video Revolution" Brochure, 7 pages, Creditron Vending Inc.

Movie Mart, "A Video Rental System..." Brochure, 6 pages, Movie Mart Corp., copyright 1984.

Primary Examiner—Alan Faber
Assistant Examiner—Robert A. Weiinhardt
Attorney, Agent, or Firm—Lerner, David, Littenberg, Krumholz & Mentlik

[57] ABSTRACT

A machine from which a customer can selectably purchase or rent a videocassette or other such product, e.g., blank videotapes, music disks, and the like, or return a previously rented videocassette. The machine comprises videocassette storage device for storing a plurality of videocassettes or other such products in discrete, identifiable locations. A customer identification device receives information about the customer. Mode selection device enables the customer to select among a vend mode, a rent mode and a return mode, and videocassette selection device enables the customer to select a desired videocassette to be vended or rented. Customer access device is provided for dispensing the selected videocassette to the customer in the vend and rent modes and receiving the videocassette from the customer in the return mode. Videocassette identification device receives information representative of the identity of the videocassette and its travel case being returned in the return mode. The videocassette is accepted for return only when its travel case has been identified as having originated from that particular machine. Videocassette transport device is provided for transporting the selected videocassette from the storage device to the customer access device in the vend and rent modes and transporting the videocassette which has been identified as being rented from that particular machine from the customer access device to the first closest available empty discrete location in the storage device in the return mode. If the videocassette is not identified, it will be placed with its travel case in a storage area within the machine to prevent its further re-rental. Memory device stores information about the customer, the selected mode, the selected videocassette, and the coordinates of videocassettes and available empty discrete locations in the storage device.

84 Claims, 20 Drawing Sheets

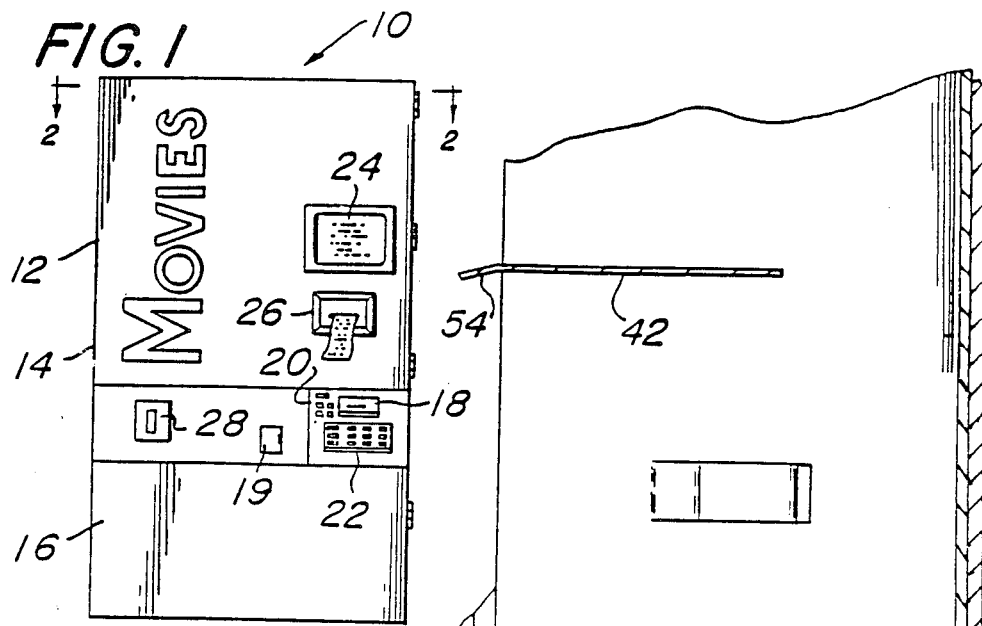
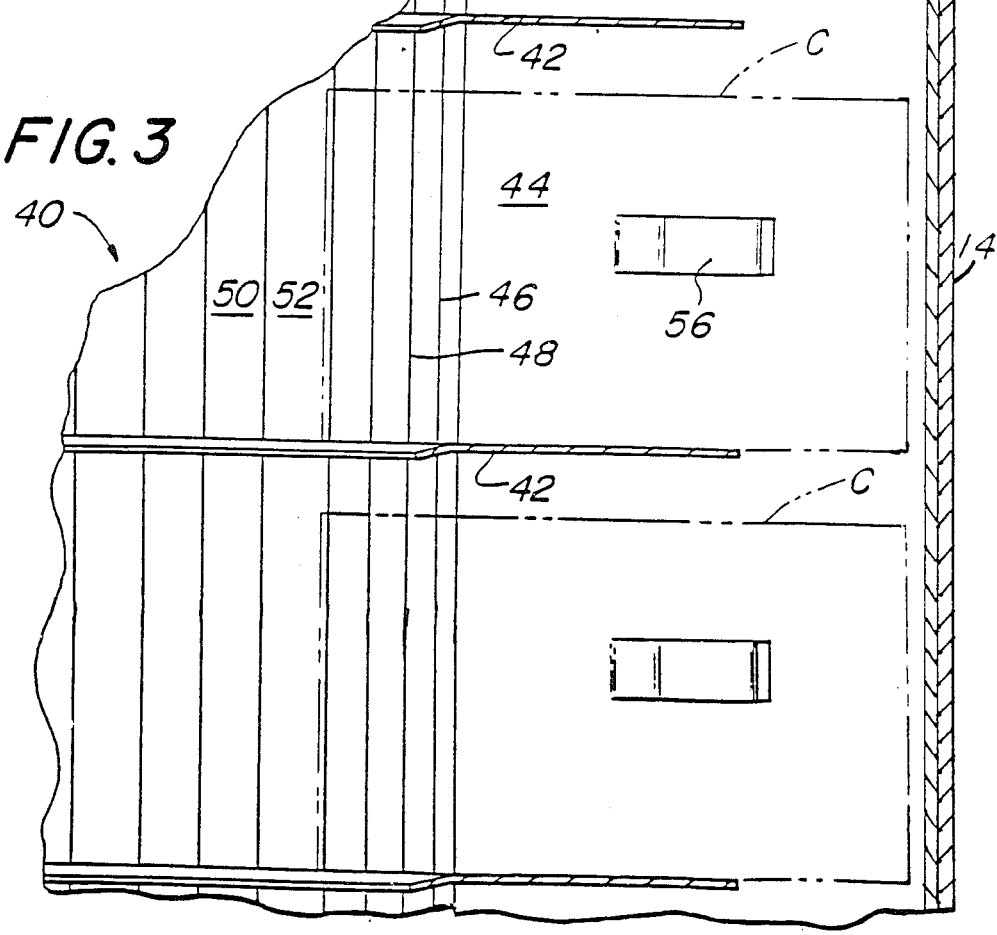

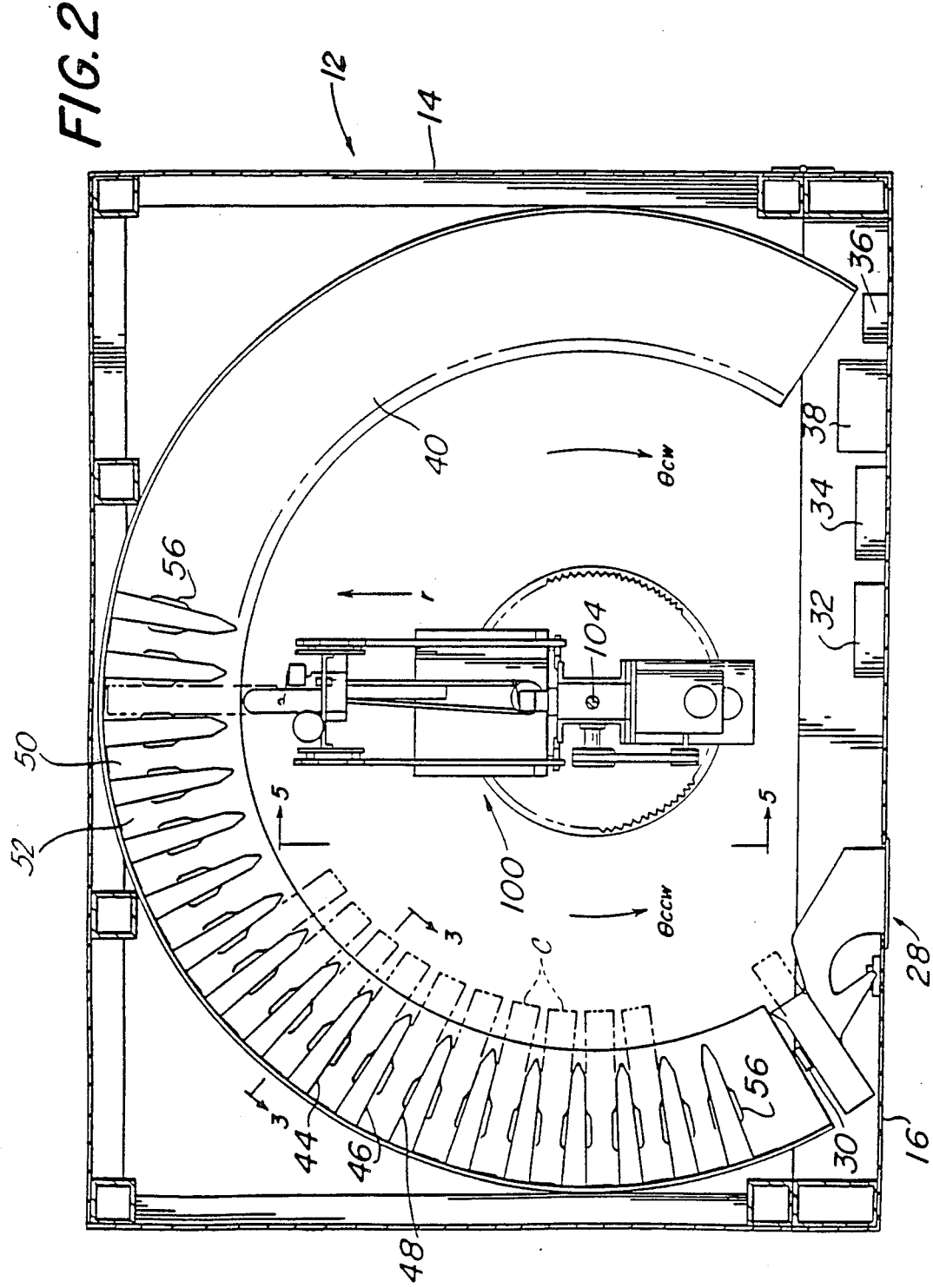

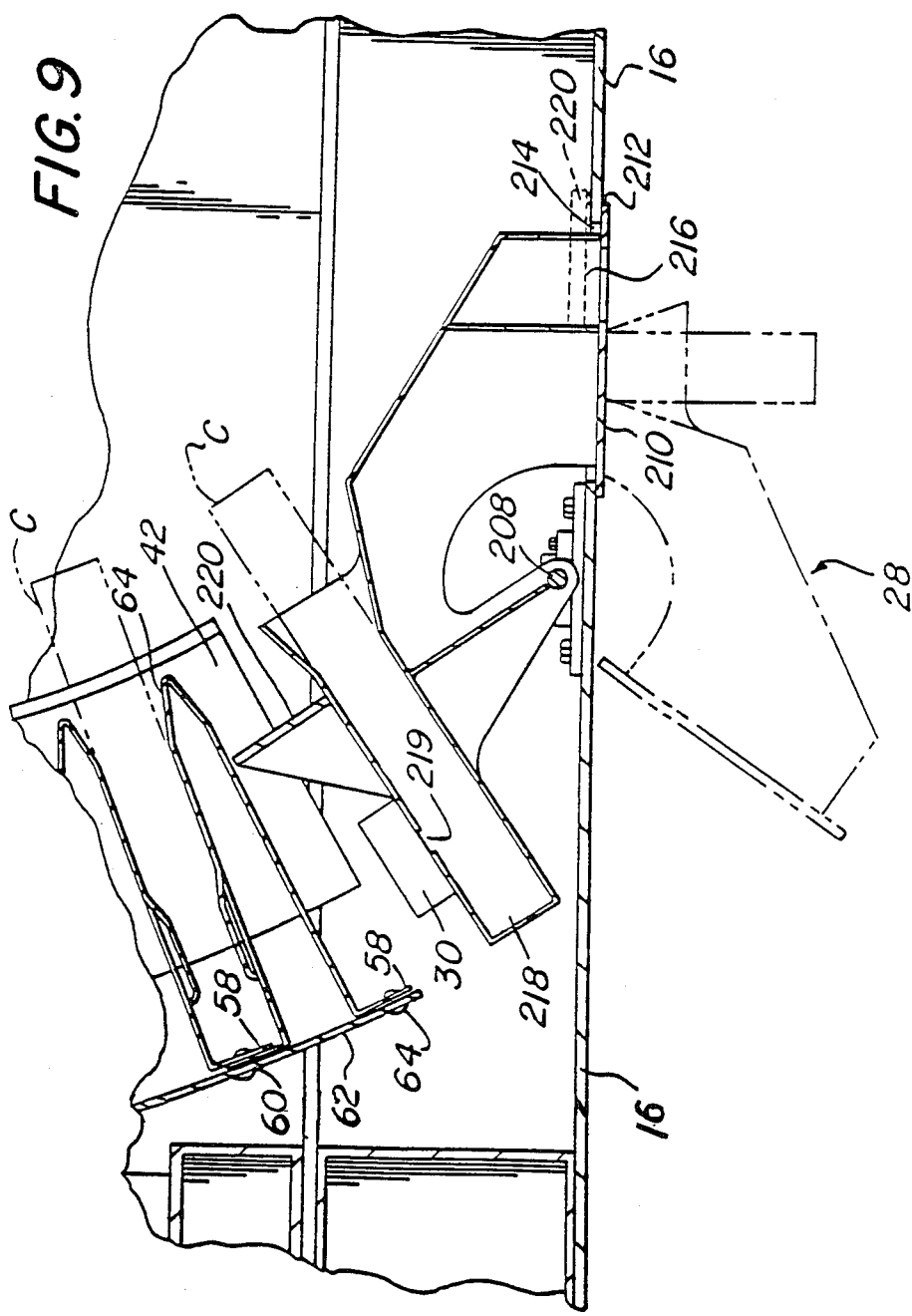

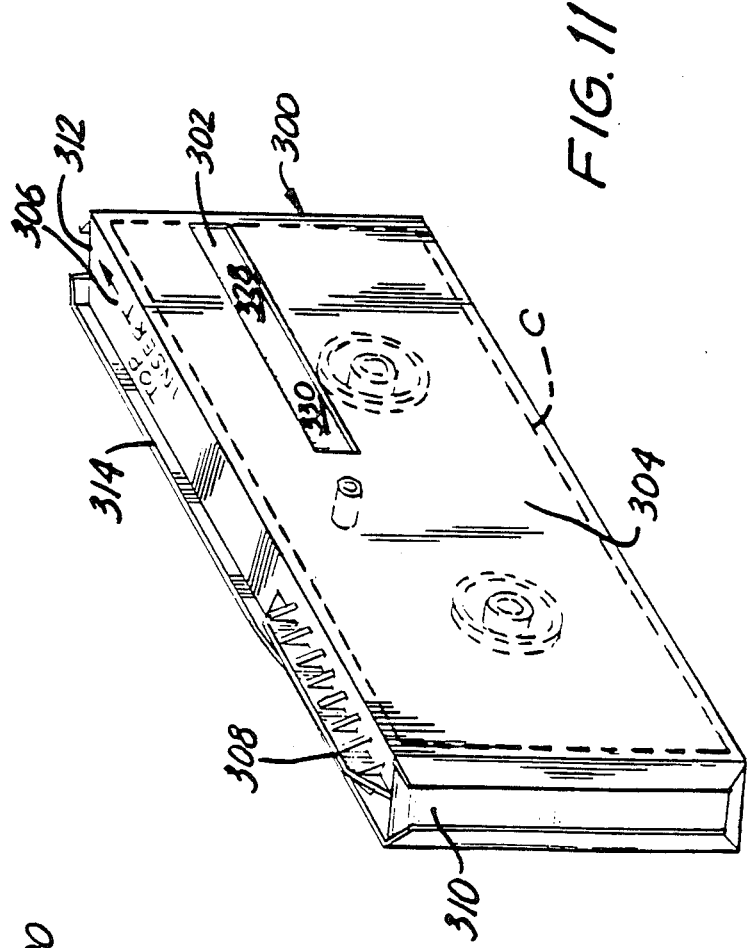
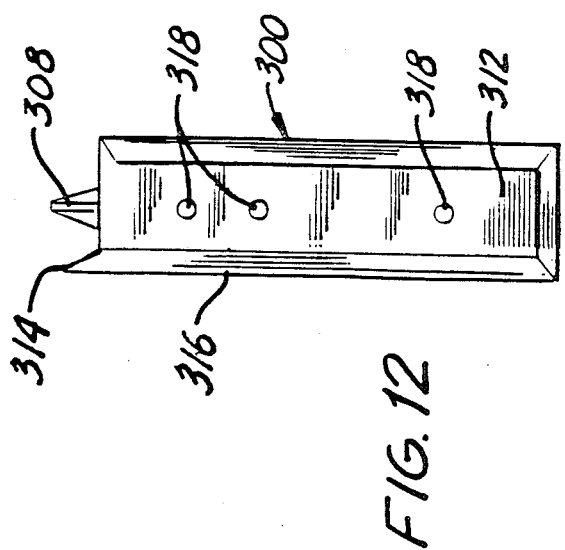

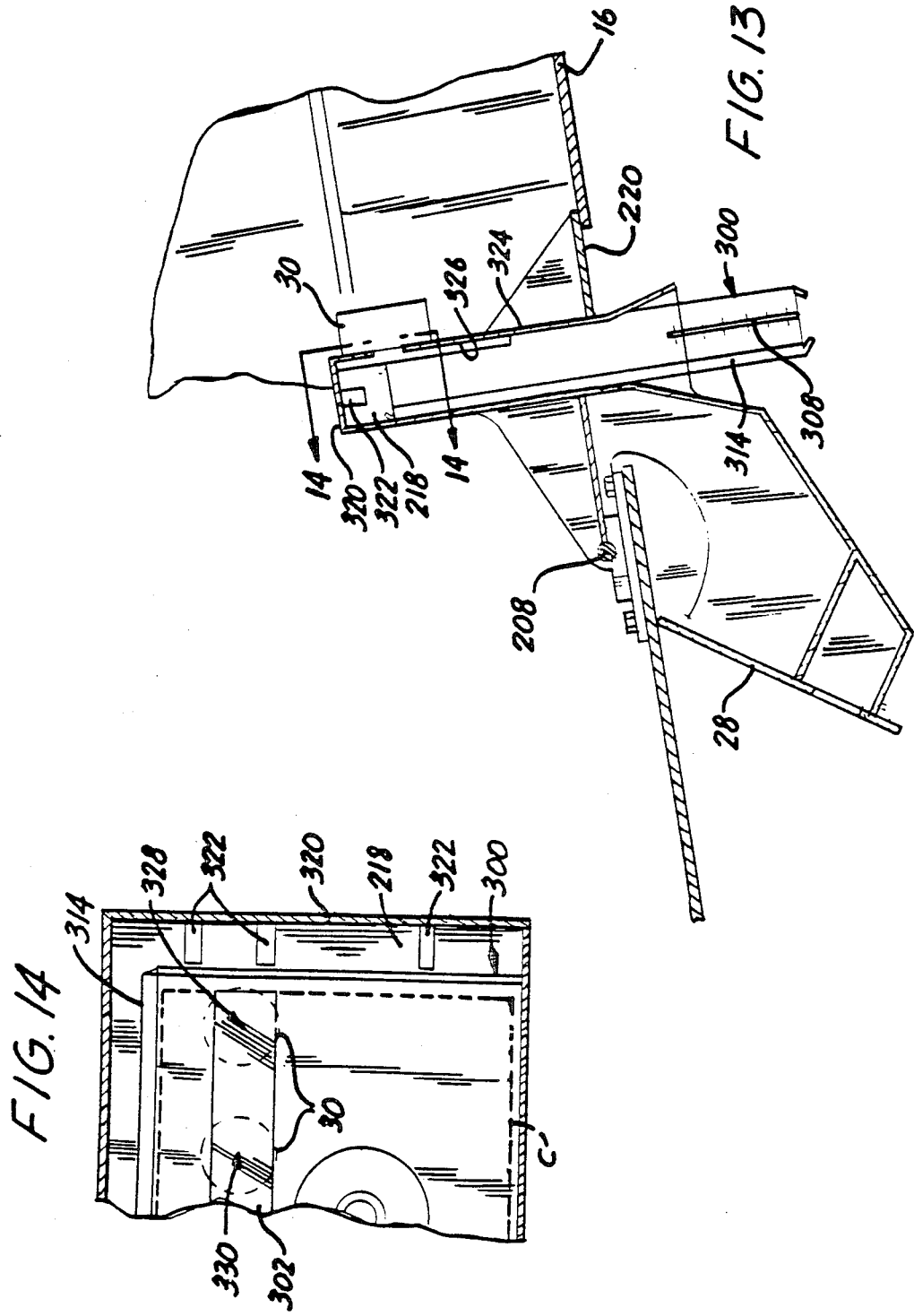

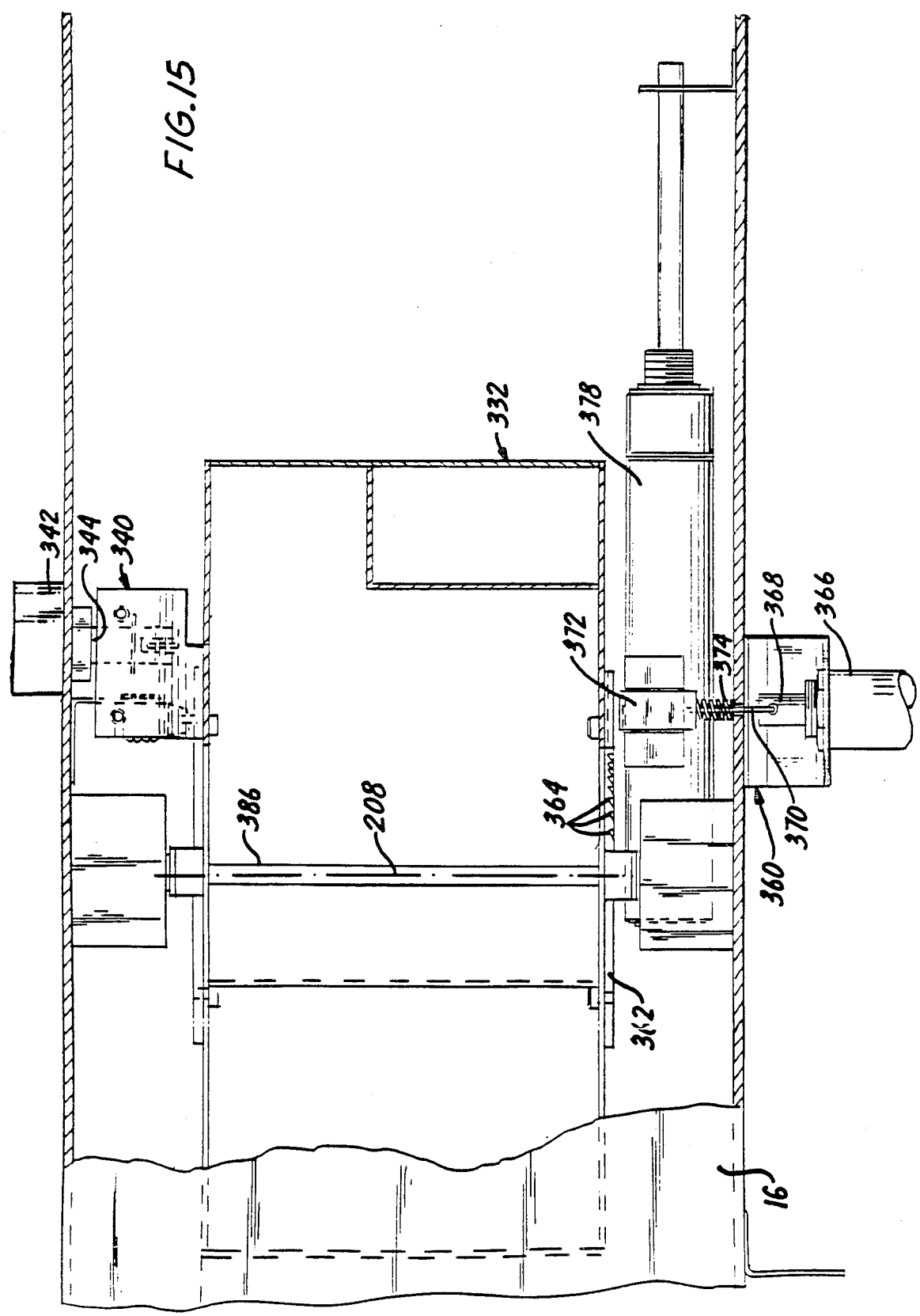

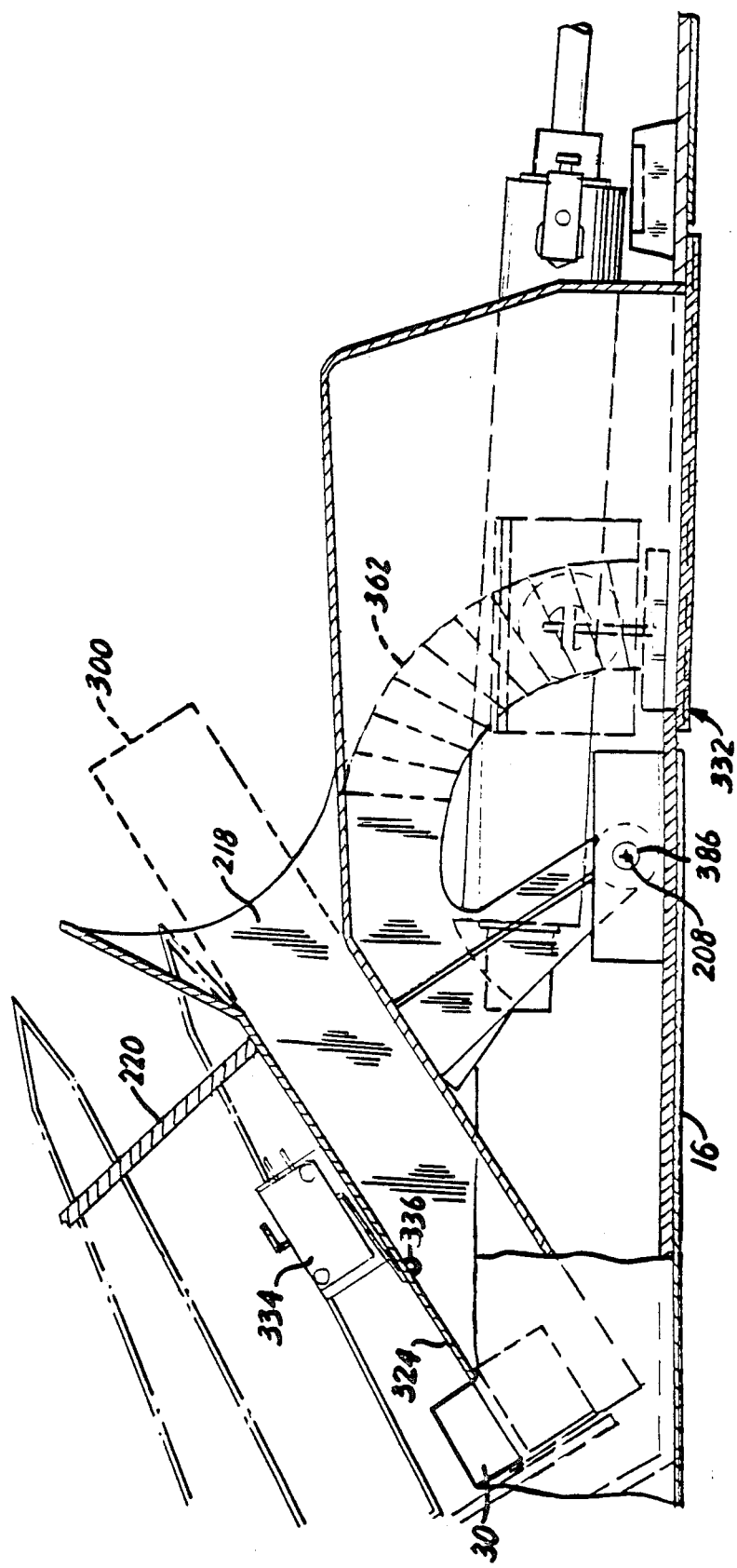

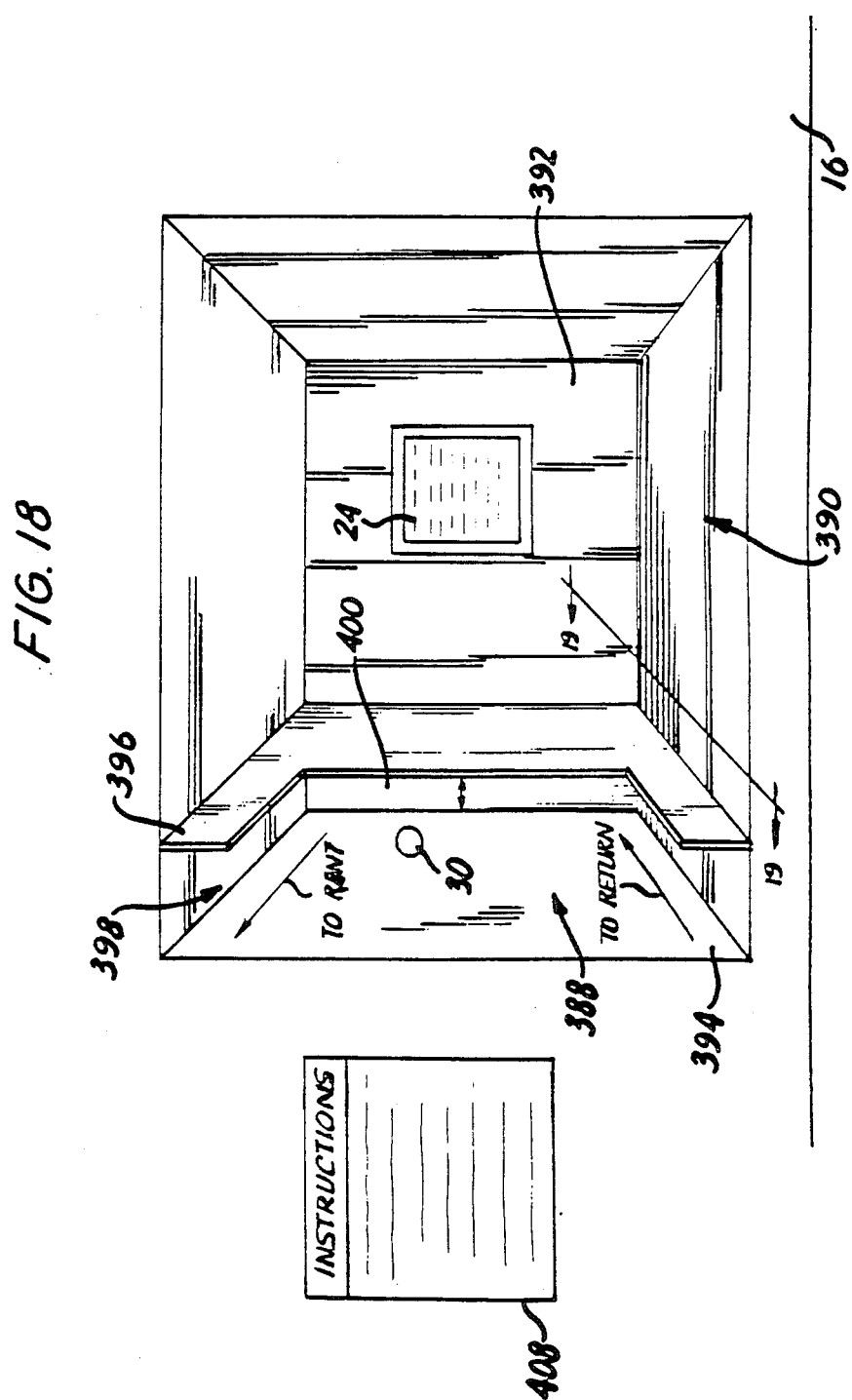

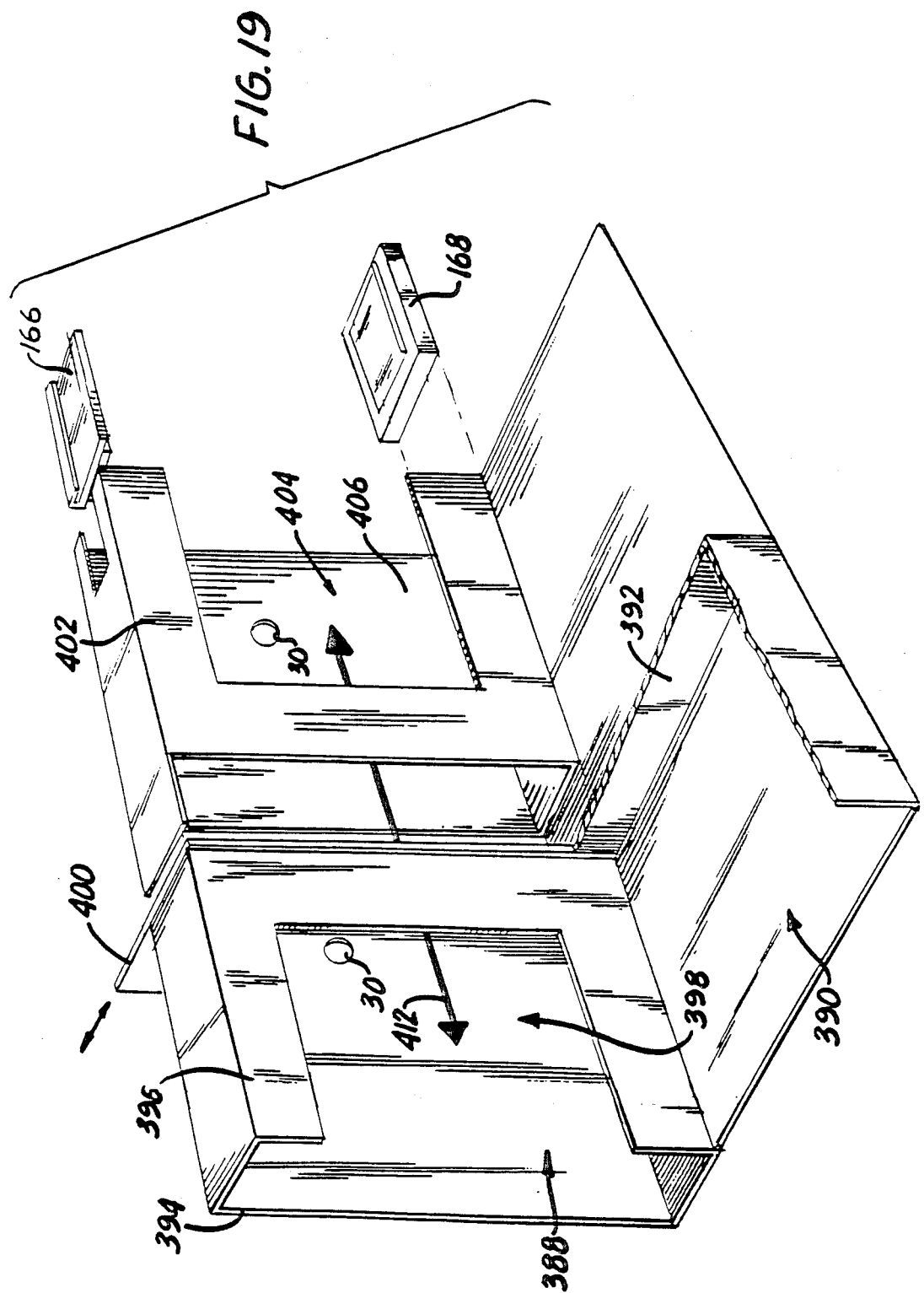

APPARATUS AND METHOD FOR STORING AND RETRIEVING ARTICLES

BACKGROUND OF THE INVENTION

This application is a continuation-in-part of application Ser. No. 868,815, filed on May 29, 1986, now U.S. Pat. No. 4814592.

The present invention relates to a machine for selling or renting videocassettes and for accepting return of rented videocassettes. As used herein, "vidiocassettes" includes prerecorded or blank videocassettes or video disks.

With the proliferation of home videocassette recorders, there has also arisen a market for pre-recorded videocassettes for home viewing. Pre-recorded videocassettes can, of course, be purchased or rented at selected retail or rental outlets. However, pre-recorded videocassettes are expensive, and hence few stores maintain a large inventory in such expensive items, either for sale or rental. in addition, such stores are not necessarily conveniently located to a large segment of the public, and store hours may not be convenient. Accordingly, there is a need to provide a conveniently located vending machine from which a user can purchase or rent and return videocassettes at any time of day. For maximum customer convenience, it would be desirable if the customer's purchase or rental could be charged to a conventional credit card account.

A number of attempts have been made at providing such a machine. For example, U.S. Pat. No. 4,414,467 discloses a videocassette ordering terminal at which a user can preview or order a videocassette for rental. The terminal permits a customer to select a videocassette for rental and return the videocassette to the terminal at the end of the rental period. No provision is made for an outright purchase of a videocassette, however, The rental can be charged to the customer's credit card account. A major drawback of this machine is that, when a vidiocassette is returned to the terminal, it cannot be placed back "on the shelf" for another rental without the intervention of a human operator, who must restock the machine. Such a machine requires a large expenditure of time, and money, to keep it stocked. If it is not restocked frequently, its convenience, and hence customer appeal, is greatly reduced.

U.S. Pat. No. 4,458,802 is an attempt to solve the problem of how to automatically restock the machine. In this patent, a carousel arrangement is used in which a videocassette to be rented and returned is assigned to a particular compartment on the carousel. There is an exact one-to-one correspondence between the videocassette and the compartment. A videocassette to be rented is vended from that compartment and, upon return, is accepted back only into that compartment. This arrangement permits some restocking, but unnecessarily limits the number of videocassettes which can be conveniently stored in the machine.

It is an object of the present invention to provide a videocassette vending machine for selectively selling or renting and returning videocassettes which overcomes the problems associated with prior vending machines.

SUMMARY OF THE INVENTION

The present invention is an apparatus for selectably selling or renting videocassettes to a customer, and comprises videocassette storage means for storing a plurality of videocassettes in discrete identifiable locations. The apparatus has customer identification means for receiving information about the customer and mode selection means for enabling the customer to select among a sell mode, a rent mode and a return mode. Videocassette selection means are provided for enabling the customer to select a desired videocassette to be vended or rented. Also provided are customer access means for dispensing the selected videocassette to the customer in the sell and rent modes and receiving the videocassette within its travel case from the customer in the return mode. Videocassette identification means are provided for receiving information representative of the identity of the videocassette and its travel case being returned in the return mode. The apparatus has videocassette transport means for transporting the selected videocassette from the storage means to the customer access means in the sell and rent modes and transporting the videocassette within its travel case from the customer access means to the closest available empty discrete location in the storage means in the return mode. A memory means is provided for storing information about the customer, the selected mode, the selected videocassette and the coordinates of videocassettes and available empty discrete locations in the storage means.

In accordance with one embodiment of the present invention, there is disclosed an apparatus for selectably vending videocassettes, the apparatus comprising storage means for storing a plurality of videocassettes in identifiable locations, mode selection means for enabling operation of the apparatus among a purchase mode or a rent mode and a return mode, videocassette selection means for enabling selection of a desired videocassette in the purchase mode or rent mode, access means for dispensing the selected videocassette in the purchase more or rent mode and receiving a videocassette in the return mode, and transport means for transporting the selected videocassette from the storage means to the access means in the purchase mode or rent mode and transporting the videocassette from the access means to any available empty location in the storage means in the return mode.

In accordance with another embodiment of the present invention, there is disclosed an apparatus for selectably vending videocassettes in a protective case, the apparatus comprising storage means for storing a plurality of videocassettes each within a protective case in identifiable locations, mode selection means for enabling operation of the apparatus among a purchase mode or a rent mode and a return mode, videocassette selection means for enabling selection of a desired videocassette in the purchase mode or rent mode, access means for dispensing the selected videocassette with its protective case in the purchase mode or rent mode and receiving the videocassette within its protective case in the return mode, protective case identificatin means for receiving information representative of the identity of the protective case being returned in the return mode, and transport means for transporting the selected videocassette within its protective case from the storage means to the access means in the purchase mode or rent mode and transporting the protective case and its contents from the access means to an empty location in the storage means in the return mode in response to the identification means receiving predetermined information with respect to the identity of the protective case, the protective case remaining in the access means in the absence of the indentification means receiving the predetermined function.

In accordance with another embodiment of the present invention, there is disclosed an apparatus for selectably vending or renting videocassettes to a customer, comprising videocassette storage means for storing a plurality of videocassettes in discrete, identifiable locations, customer identification means for receiving information about the customer, mode selection means for enabling the customer to select among a vend mode, a rent mode and a return mode, videocassette selection means for enabling the customer to select a desired videocassette to be vended or rented, customer access means for dispensing the selected videocassette to the customer in the vend and rent modes and receiving the videocassette from the customer in the return mode, videocassette identification means for receiving information representative of the identity of the viseocassette being returned in the return mode, videocassette transport means for transporting the selected videocassette from the storage means to the customer access means in the vend and rent modes and transporting the videocassette from the customer access means to any available empty discrete location in the storage means in the return mode, memory means for storing information about the customer, the selected mode, the selected videocassette, and the coordinates of the videocassettes and available empty discrete locations in the storage means.

In accordance with another embodiment of the present invention, there is provided an apparatus for selectably vending or renting videocassettes to a customer, comprising videocassette storage means for storing a plurality of videocassettes in discrete, identifiable locations, customer identification means for receiving information about the customer, mode selection means for enabling the customer to select among a vend mode, a rent mode and a return mode, videocassette selection means for enabling the customer to select a desired videocassette to be vended or rented, customer access means for dispensing the selected videocassette to the customer in the vend and rent modes and receiving the videocassette from the customer in the return mode, videocassette identification means adjacent the customer access means for receiving information representative of the identity of the videocassette being returned in the return mode, videocassette transport means for transporting the selected videocassette from the storage means to the customer access means in the vend and rent modes and transporting the videocassette from the customer access means to any available empty discrete location in the storage means in the return mode, memory means for storing information about the customer, the selected mode, the selected videocassette, and the coordinates of the videocassettes and available empty discrete locations in the storage means, and control means coupled to the customer identification means, the mode selection means, the videocassette selection means, the videocassette identification means, the videocassette transport means, and the memory means for receiving information about the customer and the selected videocassette, causing the information to be stored in the memory means, causing the videocassette transport means to transport the selected videocassette from the storage means to the customer access means and causing the information in the memory means representative of the locations of videocassettes in the storage means to be altered to indicate removal of the selected videocassette from its location in the storage means, all when in the vend or rent modes, and for receiving information about the customer and the returned videocassette, causing the information to be stored in the memory means, causing the videocassette transport means to transport the returned videocassette from the customer access means to any available empty location in the storage means and causing information in the memory means representative of the locations of videocassettes in the storage means to be altered to indicate the placement of the returned videocassette in the available empty location, all when in the return mode.

In accordance with another embodiment of the present invention, there is disclosed an article storage and transport means comprising a storage means comprising a portion of the surface of a right cylinder, the storage means having a plurality of radially-spaced dividing walls extending parallel to the axis of the cylinder, the dividing walls having means for receiving therein a plurality of axially-spaced shelves arranged to lie substantially in axially-spaced planes perpendicular to the axis of the cylinder, the walls and shelves defining discrete, identifiable storage locations therebetween, each such storage location being definable by cylindrical coordinates, and article transport means coaxial with the axis of the cylinder, further comprising first means pivotable about the axis, second means pivotable with the first means and linearly movable along the axis, and third means linearly movable along the axis with the second means for reciprocal movement toward and away from the axis along a radial direction, the article transport means further having means for moving the first means, second means and third means to any of a plurality of locations definable by cylindrical coordinates.

In accordance with another embodiment of the present invention there is disclosed an apparatus for selectively vending or renting videocassettes to a customer, comprising a cabinet, videocassette storage means in the cabinet for storing a plurality of videocassettes in discrete identifiable locations, each individual storage location being definable by cylindrical coordinates, customer identification means for receiving information about the customer; means for accepting cash from the customer, mode selection means for enabling the customer to select among a vend mode, a rent mode, and a return mode, means for enabling the customer to select between a cash mode or credit mode of operation, videocassette selection means for enabling the customer to select a desired videocassette to be vended or rented, customer access means in the cabinet for dispensing the selected videocassette to the customer in the vend and rent modes and receiving the videocassette from the customer in the return mode, the customer access means including means thereon for preventing insertion of objects other than videocassettes into the interior of the apparatus, videocassette identification means adjacent the customer access means for receiving information representative of the identity of the videocassette being returned in the return mode, videocassette transport means for transporting the selected videocassette from the storage means to the customer access means in the vend and print modes and transporting the videocassette from the customer access means to any available empty discrete location in the storage means in the return mode, the videocassette transport means having first means pivotable about an axis, second means pivotable with the first means and linearly movable along the axis, and third means linearly movable along the axis with the second means for reciprocal movement toward and away from the axis, and having means for moving the first means, second means and third means to any of a plurality of locations defined by cylindrifal coordinates, memory means for storing information about the customer, the selected mode, the selected videocassette, and the coordinates of videocassettes and available empty discrete locations in the storage means, control means coupled to the customer identification means, the mode selection means, the videocassette selection means, the videocassette identification means, the videocassette transport means, and the memory means for receiving information about the customer and the selected videocassette, causing the information to be stored in the memory means, causing the videocassette transport means to transport the selected videocassette from the storage means tob the customer access means and causing the information in the memory means representative of the locations of the videocassettes in the storage means to be altered to indicate removal of the selected videocassette from its location in the storage means, all when in the vend or rent mode, and for receiving information about the customer and the returned videocassette, causing the information to be stored in the memory means, causing the videocassette transport means to transport the returned videocassette from the customer access means to any available memory location in the storage means and causing information in the memory means representative of the locations of videocassettes in the storage means to be altered to indicate the placement of the returned videocassette in the available empty location, all within the return mode, and means for automatically placing videocassettes to be stored in any available empty location in the storage means and for automatically storing in the memory means information representative of the stored videocassette and its corresponding location in the storage means.

In accordance with another embodiment of the present invention, there is disclosed a method for selectably vending videocassettes from an apparatus comprising the steps of storing a plurality of videocassettes in identifiable locationsin a storage means, enabling selective operation of the apparatus among a purchase mode or a rent mode and a return mode, enabling selection of a desired videocassette in the purchase mode or rent mode, dispensing the selected videocassette in the purchase mode or rent mode and receiving a videocassette in the return mode, and transporting the selected videocassette from the storage means to a customer access means in the purchase mode or rent mode and transporting the videocassette from the access means to any available empty location in the storage means in the return mode.

In accordance with another embodiment of the present invention, there is disclosed a method for selectably vending videocassettes in a protective case from an apparatus comprising the steps of storing a plurality of videocassettes each within a protective case in identifiable locations in a storage means, enabling selective operation of the apparatus among a purchase mode or a rent mode and a return mode, enabling selection of a desired videocassette in the purchase mode or rent mode, dispensing the selected videocassete with its protective case in the purchase mode or rent mode and receiving the videocassette within its protective case in the return mode, receiving information representative of the identity of the protective case being returned in the return mode, and transporting the selected videocassette within its protective case from the storage means to a customer access means in the purchase mode or rent mode and transporting the protective case and its contents from the access means to an empty location in the storage means in the return mode in response to receiving predetermined information with respect to the identity of the protective case, the protective case remaining in the access means in the absence of receiving the predetermined information.

In accordance with another embodiment of the present invention, there is disclosed a method of automatically selectably vending or renting videocassettes to a customer, comprising the steps of storing a plurality of videocassettes in discrete, identifiable locations in a storage means, receiving information about the customer, enabling the customer to select among a vend mode, a rent mode and a return mode, enabling the customer to select a desired videocassette to be vended or rented; dispensing the selected videocassette to the customer in the vend and rent modes and receiving the vidocassette from the customer in the return mode, receiving information representative of the identity of the videocassette being returned in the return mode; automatically transporting the selected videocassette from a storage location to a customer access means for dispensing the selected videocassette in the vend and rent modes and automatically transporting the videocassette from the customer access means to any available emptyb storage location in the return mode, and storing information about the customer, the selected mode, the selected videocassette, and the coordinates of videocassette and available empty discrete locations in the storage means in a memory for later retrieval and processing.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a front elevational view of a videocassette vending machine in accordance with the present invention.

FIG. 2 is a cross-sectional view taken along the lines 2—2 of FIG. 1.

FIG. 3 is a partial sectional view taken along the lines 3—3 of FIG. 2.

FIG. 9 is an enlarged view, partially broken away, of the customer access door constructed in accordance with one embodiment of the present invention.

FIG. 11 is a perspective view of a videocassette travel case containing a videocassette, each provided with the videocassette identification means.

FIG. 12 is a right side elevational view of the videocassette travel case, shown in FIG. 11, having coded pin receiving means.

FIG. 13 is an enlarged view, partially broken away, of the customer access door constructed in accordance with another embodiment of the present invention.

FIG. 14 is an enlarged sectional view, partially broken away, taken along the linew 14—14 of FIG. 13.

FIG. 15 is a front elevational view, in partial cross-section, of the customer access door constructed in accordance with another embodiment of the present invention.

FIG. 16 is a top plan view, in partial cross-section, of the customer access door shown in FIG. 15.

FIG. 18 is a front elevational view of the customer access door constructed in accordance with another embodiment of the present invention.

FIG. 19 is a perspective view, partially broken away, taken along the lines 19—19 of FIG. 18.

DESCRIPTION OF THE PREFERRED EMBODIMENT

Figure 4:
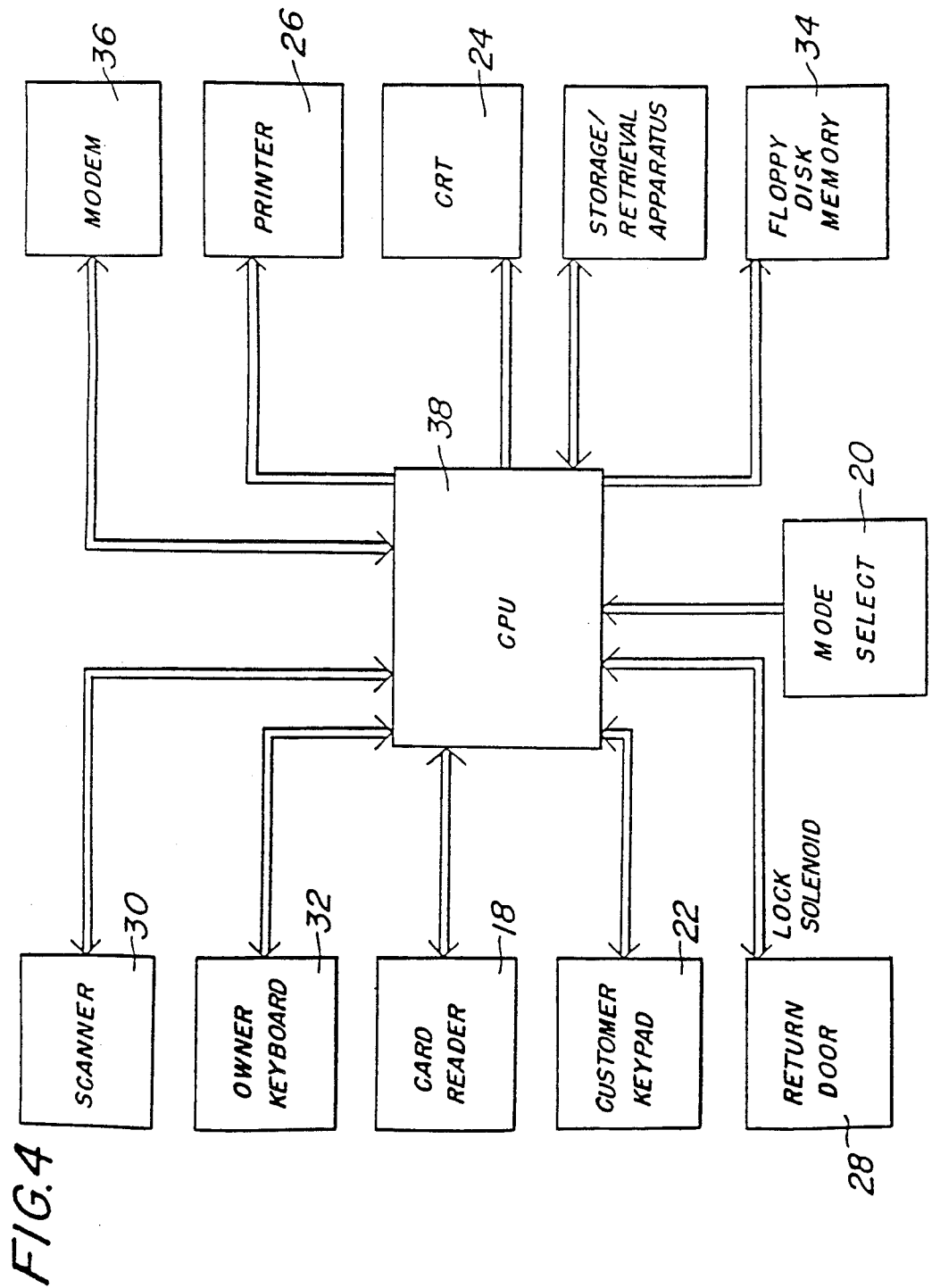
FIG. 4 is a block diagram of the major components of the apparatus of the present invention.

Referring now to the drawings, wherein like numerals indicate like elements, there is shown in FIG. 1 a videocassette vending machine 10 in accordance with the present invention. Vending machine 10 comprises a cabinet 12 which in turn consists of a shell 14 and a door 16 which is hinged along one side of shell 14 to provide access to the interior of shell 14 from the front of cabinet 12. Mounted on the front of door 16 and movable with it are a customer identification means in the form of credit card reader 18. Also mounted on the front of door 16 are mode selection push buttons 20 and a key pad 22 by means of which a customer can select a desired videocassette to be vended or rented and enter other numerically-coded information, e.g., a personal identification number such as a pin number, club card number or debit card number, to vending machine 10. A CRT display 24 is provided on the front of door 16 for displaying information and messages to the customer, and for displaying information to the owner/operator of the machine, as will be described in greater detail below. A printer 26 is also provided on the front of door 16 for printing customer receipts, coupons, reports for the owner/operator and the like.

Card reader 18 may be a commercially available credit card reader which reads magnetically-coded information contained on the magnetic stripe on the back of a conventional credit card. Card reader 18 generates digital output signals representative of the magnetically-coded information. Instead of or in addition to card reader 18, a coin or bill accepting unit 19 can be provided, so that a customer can rent or purchase tapes using either a credit card, club card, client card or cash, or the like. An appropriate push-button 20 may be provided which enables the customer to choose between cash and credit modes of operation. Customer key pad 22 may be any suitable sixteen position key pad containing the digits 0 through 9 and other suitably identified keys.

As shown in FIG. 4, owner keyboard 32 may be any suitable alphanumeric keyboard for communicating with CPU 38. Printer 26 may be any suitable printer. Memory unit 34 may be any suitable memory. Although a floppy disk memory is preferred, any other suitable memory unit, such as a magnetic core memory, semiconductor memory, and the like, may be employed. CRT 24 and modem 36 may be any suitable commercially available devices. Scanner 30 is preferably, but need not be, a bar code reader. When a bar code reader is used for scanner 30, videocassettes and/or their travelling cases to be vended by machine 10 are provided with a suitable bar code which can indicate, inter alia, an identifying number, title, owner number, and the like.

Referring now to FIG. 2, a customer access door 28 is provided in door 16 for dispensing a selected videocassette to be vended or rented and for receiving a videocassette to be returned to vending machine 10. Mounted on customer access door 28 is located videocassette and travelling case identification means in the form of an optical scanner 30. Scanner 30 receives information relative to the identity of a returned cassette and travelling case when they are inserted into customer access door 28.

Also mounted on the interior of door 16 are the owner/operator keyboard 32 by means of which the owner/operator (also referred to herein as "owner" or "operator") can communicate with vending machine 10, the central processor unit, or CPU 38, the memory unit 34, and the modem 36 by means of which videocassette vending machine 10 may communicate with a host processor.

As best seen in FIG. 2, the interior of shell 14 is provided with a videocassette storage means 40. In the plan view, storage means 40 is arcuate in shape and encompasses a substantial portion of the circumference of a circle centered along the axis of the videocassette transport means, to be described in greater detail below. Storage means 40 extends from the top to the bottom of the interior of shell 14 parallel to the axis of the videocassette transport means, and comprises a plurality of shelves 42 which extend horizontally (see FIG. 2). Extending vertically are a plurality of internal walls 44, 46, 48, etc., which define vertically oriented channels therebetween. Walls 44, 46, 48, etc., are slotted at uniformly spaced locations to receive shelves 42. Shelves 42 and walls 44, 46, 48, etc., define a plurality of videocassette storage locations 50, 52, etc., which hold videocassettes to be vended. By using this arrangement, storage space is minimized while the number of available storage locations is maximized. For example, approximately 500 storage locations may be provided in a cabinet only seven feet high by three feet deep by four feet wide. Shelves 42 are canted downwardly at their external edge 54 (see FIG. 3) to facilitate insertion of videocassettes C into the storage compartments.

Walls 44, 46, 48, etc. are provided with struck-out portions 56 which extend into storage locations 50, 52, etc. Struck-out portions 56 are resiliently deformable toward walls 44, 46, 48, etc., and help grip a videocassette after it has been inserted into a storage location and hold it securely in that location.

A preferred form of walls 44, 46, 48, etc., is shown in FIG. 9. As can be seen from FIG. 9, each wall may be formed from a sheet of suitable metal, such as galvanized stainless steel or aluminu, which is bent to form substantially a V-shape. During the forming process, flanges 58 and 60 are formed at the open ends of the V. Each individual wall may be attached to an arcuate supporting shell 62 by any suitable means, such as by rivets 64. Flanges 58 and 60 of adjacent walls may be overlapped, as shown in FIG. 9, and riveted together to shell 62. Individual walls can thus be attached around the entire circumference of shell 62. The closed end of the V is tapered, as at 64, to facilitate insertion of a videocassette C into the individual storage locations formed by the walls and shelves 42. Of course, it is understood that any other method of forming the walls, such as an extrusion process, and any other suitable material, such as an engineering plastic, may be used. This structure enables storage means 40 to be manufactured quickly and at low cost.

As seen in the figures, the precise position of a storage location within shell 14 can be defined by a system of cylindrical coordinates (r, $\theta$, z). The r direction, indicated by the arrow in FIG. 2, is radial of the axis of the transport means. The $\theta$ coordinate represents the angular position of the videocassette transport means with respect to a reference point. The videocassette transport means is capable of movement in both the clockwise and counterclockwise directions, as will be described below. The z coordinate represents movement of the videocassette transport means perpendicular to the plane of FIG. 2 along the axis of the videocassette transport means, as will be described below.

Figure 5:
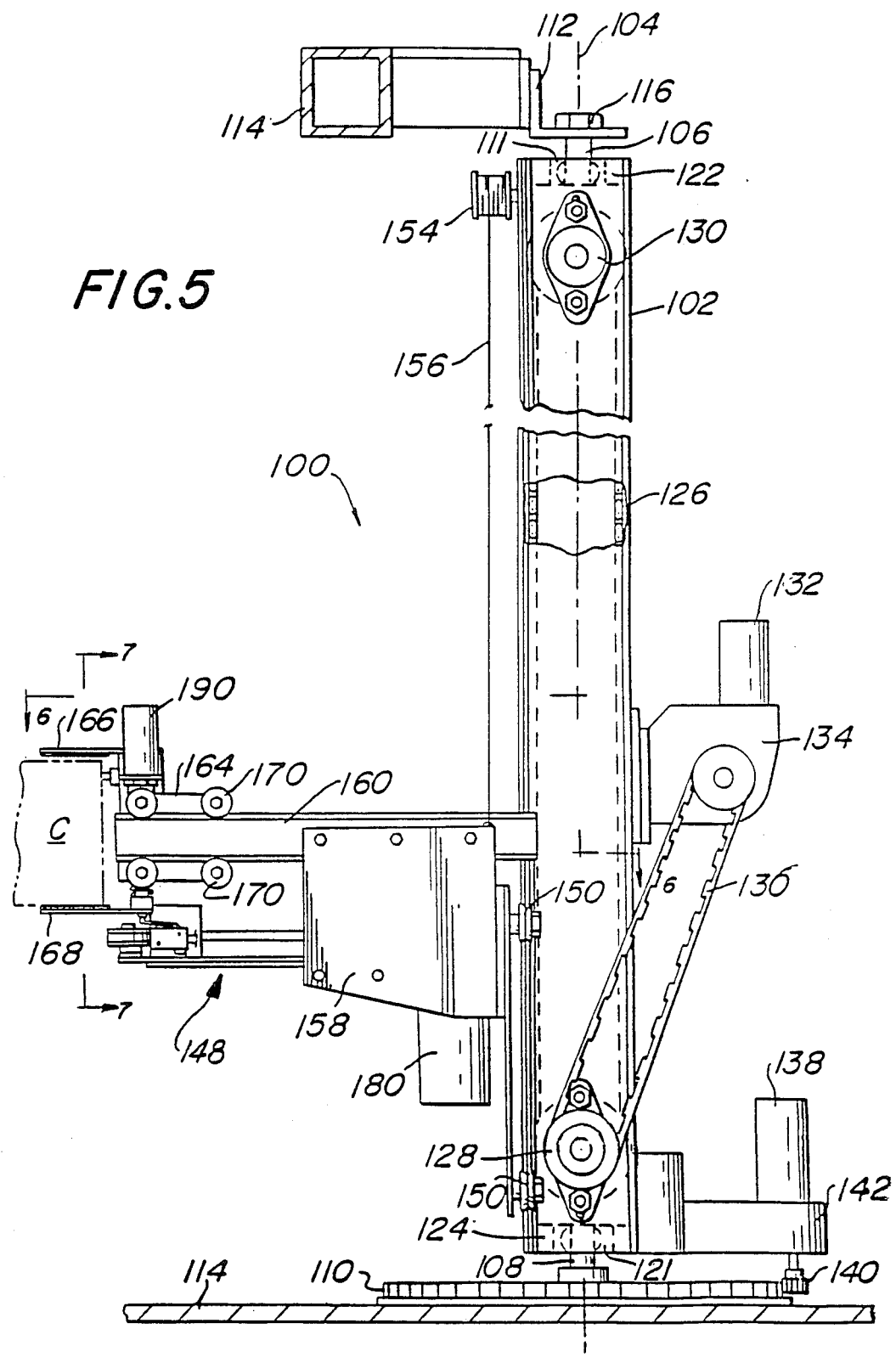
FIG. 5 is an elevational view of the videocassette transport means taken along the lines 5—5 of FIG. 2.

The interconnection of te major components of the machine is best seen in the block diagram of FIG. 4. As shown in FIG. 4, the videocassette vending machine 10 is governed by CPU 38, which may be any suitable microprocessor based CPU. For example, an IBM compatible MS/DOS-driven CPU may be utilized. Alternatively, a standard bus system may be used. The CPU 38 receives inputs from scanner 30, owner/operator keyboard 32, credit card reader 18, key pad 22, and mode selection switches 20. CPU 38 also receives as inputs signals from limit switches associated with customer access door 28 and the videocassette transport means 100 (as shown in FIG. 5 and as described below), which provide information to CPU 38 indicative of the state of customer access door 28 (i.e., open or closed) and the z and $\theta$ positions of the videocassette transport means. Specifically, the following inputs are provided to CPU 38 by means of limit switches:

1. limit of motion upward in z direction
2. limit of motion downward in z direction
3. limit of motion clockwise in $\theta$ direction
4. limit of motion counterclockwise in $\theta$ direction
5. picker assembly extended in r direction
6. picker assembly retracted in r direction
7. picker fingers open/closed
8. videocassette in picker assembly
9. customer access door open
10. videocassette in access door
11. picker assembly home-z position
12. picker assembly home-$\theta$ position Each of the limit switches will be described in greater detail below. CPU 38 also receives demodulated data transmitted to videocassette vending machine 10 from a host processor by means of modem 36.

CPU 38 generates a number of data and control outputs in response to its inputs. CPU 38 generates printer control and data signals for printer 26, alphanumeric display characters for CRT 24 and data outputs for storage in memory unit 34. CPU 38 also generates appropriate timing and control signals for scanner 30, owner/operator keyboard 32, card reader 18, and key pad 22.

CPU 38 generates control signals to the various solenoids and electric motors associated with videocassette transport means 100, and a control signal for the locking solenoid associated with customer access door 28. Specifically, the following control signals are generated by CPU 38:

1. upward z-direction motor drive on/off
2. downward z-direction motor drive on/off
3. z-direction motor speed fast/slow
4. clockwise $\theta$-direction motor drive on/off
5. counterclockwise $\theta$ direction motor drive on/off
6. $\theta$-direction motor speed fast/slow
7. picker solenoid open/close
8. outward r-direction picker assembly motor drive on/off
9. inward r-direction picker assembly motor drive on/off
10. customer access door latch open/close As noted above, CPU 38 may be an IBM PC-compatible microcomputer. Thus, CPU38 can be programmed to perform a number of different functions and to provide for a number of data bases. Although any number of different data bases will suggest themselves to those skilled in the art, the data bases listed in Table I below are typical of the type of data bases which can be programmed into CPU 38.

TABLE I

| Data Base | Function |
| --- | --- |
| Inventory | Current machine contents including rented items |
| Transaction | All rentals and purchases |
| Cost codes | Rental fees |
| Credit card data | Miscellaneous card data |
| Card digit flags | Valid cards |
| Multiple rental discounts | Discounts based on multiple rentals |
| Matinee table | Matinee discounts |
| Levels of access | Provide different access levels for owner, clerk, serviceman |
| Passcode, opcode and access level table | Definition of codes |
| Lost sales | Sales lost due to item not in stock |
| Error log | System failures and messages |
| Device installation list | Simulate various machine components for troubleshooting |
| Definable variables | Assorted operational parameters |

The inventory data base may consist of a linear array whose size is equal to the total number of storage locations available in the vending machine 10. Each individual inventory record may contain the following information:

| | | |
| --- | --- | --- |
| 1. | Selection number | 4 digits |
| 2 | Cost code | 1 digit |
| 3. | Title | 20 characters |
| 4. | Category | 1 digit |
| 5. | Rating | 1 digit |
| 6. | Owner number | 3 digits |
| 7. | Copy number | 2 digits |
| 8. | Purchase only price | 4 digits |
| 9. | Row number | 2 digits |
| 10. | Column number | 2 digits |
| 11. | Type | 1 digit |

The selection numnber may be a unique number which the customer uses to identify the product he wishes to purchase or rent. The cost code identifies the prices applicable to the product dependent upon the cost code and matinee tables, discussed below. The title is a 20 character alphanumeric description of the videocassette. The category is a single digit that defines operator selected categories. As an example, the digit $\theta$ may refer to westerns, the digit 1 to comedies, the digit 2 to science fiction, and so forth. The rating is a single digit that defines the MPAA ratings of films. For example, the digit $\theta$ may represent a G rating, the digit 1 may represent a PG rating, and so forth. The owner number is a three-digit number which defines the owner of the particular videocassette in inventory. The copy number is a two-digit number dependent upon the number of copies of the same videocassette. Obviously, multiple items with the same selection number will have different copy numbers. The purchase only price is used only if the videocassette is available for purchase only. If the videocassette is for rental, this field is all zeros.

The row number and column number are two-digit fields which reflect the location of the videocassette in the storage means. These digits are set to zero if the product is currently rented out. When an item is purchased, either deliberately or by default by not returning a rental cassette, the inventory record for the item is cleared.

The type digit identifies the product type, such as VHS, Beta, 8 mm, purchase only, or any other product type. Note that the items for outright purchase, such as pre-recorded or blank videocassettes, can be vended outright.

The transaction data base may be a linear array whose sizes are equal to the total number of transactions that may be stored in memory unit 34. Each individual transaction record may contain the following information:

| | | |
|---|---|---|
| 1. | Credit card number | 16 digits |
| 2. | Credit card expiration date | 4 digits |
| 3. | Authorization number | 4 characters |
| 4. | Rental/purchase time | 4 digits |
| 5. | Rental/purchase date | 4 digits |
| 6. | Return time | 4 digits |
| 7. | Return date | 4 digits |
| 8. | Rental/purchase cost | 5 digits |
| 9. | Transactoon open/closed/processed | 5 digits |
| 10. | Selection number | 4 digits |
| 11. | Cost code | 1 digit |
| 12. | Title | 20 characters |
| 13. | Category | 1 digit |
| 14. | Rating | 1 digit |
| 15. | Owner number | 3 digits |
| 16. | Copy number | 2 digits |
| 17. | Purchase only price | 4 digits |
| 18. | Row number | 2 digits |
| 19. | Column number | 2 digits |
| 20. | Type | 1 digit |

It will be observed that the items 10–20 are the same as in an inventory data base record. This will be redundant information for rental items, but will be necessary for purchase items. A transaction record is created when the rental transaction is initiated and it is kept in the memory unit 34 until the transaction is billed to the customer's credit card account.

The cost code data base is used to define the cost of any item that is available for both rental and purchase. This table can store both the base rental and purchase price, keyed by cost code and day code. There may be ten cost codes, zero through nine, each of which represents a different purchase and/or rental price. The rental price can also vary according to day of the week, so that rentals may be made cheaper during off peak rental days and more expensive during high peak rental days.

The credit card data base is capable of storing the customer's sixteen digit credit card number along with additional information about the customer, indexed by his credit card number. For example, a one digit code may be used to indicate whether the customer habitually returns rented videocassettes in a damaged condition. If so, the owner/operator may no longer wish to rent videocassettes to that customer, and can so indicate by an appropriate code, and the vending machine will not accept that credit card. The credit card data base can also keep track of accumulated rentals by a particular customer. This is useful in the event that the owner/operator wishes to run special promotions such as free rental with every ten paid rentals. The data base can also jeep track of the date and time of the customer's last rental.

The card digit flags table can be used to indicate various credit card parameters. For example, the vending machine 10 can be set to accept only credit cards whose first digits correspond to certain numbers. For example, American Express credit cards normally begin with the number 3, Visa cards with the number 4, and Mastercard cards with the number 5. The machine can thus be set to accept only selected credit cards. The machine can also be set to accept only a credit card, such as a "club card", issued by the owner/operator. Such cards may be given a zero or nine as the first digit to uniquely identify them as cards issued by the owner/operator. In addition, a club card can be given a second flag digit, such as the last digit of the card number, which can be used to indicate that certain classes of films, such as adult films, cannot be vended or rented on that card.

The multiple rental discount data base is used if a customer rents more than one videocassette at a time. The data base can be used to grant discounts for multiple rentals.

The matinee table provides for reduced rentals at off peak periods. Each cost code, discussed above, has a matinee table entry. If the videocassette is rented after a specified time and returned before a specified time on the same day, a discount may be applied to the rental.

The levels of access data base defines three levels of access to information stored in memory unit 34. This allows various classes of the owner/operator's employees access to only predetermined data.

Analogous to the levels of access data base is the pass code, opcode and access level data base. There may be nine pass code cards which provide access to various operating commands as defined by their access level. The owner/operator may be given the highest access. His data processing clerk may be given the next level of access, and his serviceman may be given the lowest level of access. Each level of access also has access to levels below, but not to the levels above it.

The lost sales data base is used to maintain a sequential list of all lost sales due to a requested videocassette being unavailable for sale or rental. This list may be as long as necessary and is limited only by storage space in memory unit 34. This list enables the operator to keep track of high demand videocassettes so that the operator can adjust the mix of videocassettes available for sale or rental for the particular market.

The error data base is used to maintain a sequential list of errors and messages that are deemed important enough to save for later operator inspection. As an example, the data base may keep track of malfunctions in the videocassette transport means, failure of the scanner 30, lack of paper for printer 26, and the like. CPU 38 may also be provided with the ability to call the owner's host processor via modem 36 to alert the owner to problems before they effect the ability of his machine to service customers.

The device installation data base is used primarily for de-bugging the system. Certain devices can be simulated through the owner/operator keyboard 32.

The definable variables data base allows the owner/operator to define his own unique variables such as maximum rental time, rental grace period, number of rentals required to receive a free rental, number of open rentals allowed per credit card, and the like.

The CPU 38 can also be programmed to generate reports and receipts which can be printed by printer 26. The following reports and receipts can be generated:
1. Rental receipt
2. Return receipt (normal)
3. Return receipt (conditional)
4. Lost sales report
5. Current inventory report
6. Videocassettes out report The rental receipt, generated when a rental tape is dispensed, may display the selection number, selection title, date, time, credit card number, authorization code and machine number. The normal return receipt may display the selection number and title of the selection, the date and time out, date and time returned, credit card number, authorization number, machine number and rental charge. The conditional return receipt is printed if the returned videocassette is unacceptable for any reason, e.g., if the output of scanner 30 indicates that the return videocassette or its travel case was not rented from the machine or it is not in the owner's inventory. This receipt may display a telephone number of the owner/operator which the customer can call for service. The lost sales report can display the selection numbers of requested but unavailable videocassettes and the number of requests made for those videocassettes. The current inventory report may be a listing of selection, cost code, title, category, type, owner number, copy number, purchase price, row and column number. This information can also be printed out for the "videocassettes out" report.

All of the data bases can be uploaded to a host processor by means of modem 36Z. The modem is capable of either initiating a call or receiving a call to or from the host processor. The data bases may be uploaded to the host processor from the videocassette vending machine 10 or downloaded from the host processor to machine 10. This permits the owner/operator of a number of machines 10 to perform all record keeping at a central host processor site.

A feature of the invention is the ability of CPU 38 to display a number of different messages via CRT 24. These messages, or "screens", include operator-defined screens which enable the owner/operator to display custom designed messages, and screens which may display instructions and prompts to the customer. CRT may also display data and reports to the owner/operator, and special screens to enable the owner/operator to troubleshoot and set up the machine.

The way in which CPU 39 can be programmed to provide these and other data bases, and to carry out the above-described and other functions, is well within the ordinary skill in the art and need not be described here.

The mechanical structure of videocassette transport means 100 is illustrated in FIGS. 5–8. As best seen in FIG. 5, transport means 100 comprises a vertical mast 102 which is mounted for revolution about a central longitudinal axis 104. Mast 102 is journaled with a self-aligning feature for revoltion about axis 104 by cylindrical pins 106 and 108 at the top and bottom, respectively, of mast 102. Pin 108 is fixed in a recess (not shown) coaxial with circular sun gear 110 and projects through a self-aligning bearing 121 in an opening in spacer block 124 at the bottom of mast 102. Pin 106 projects through an opening in bracket 112, which is fixed to the internal framework 114 of videocassette vending machine 10. Pin 106 also projects through a self-aligning bearing 111 within an opening in spacer block 122 at the top of mast 102. For ease of installation of mast 102 during assembly of machine 10, mast 102 is simply lowered into place on pin 108 in sun gear 110, pin 106 is inserted into spacer block 122 through bracket 112, and the head 116 of pin 106 is then welded or otherwise fastened to bracket 112.

Figure 6:
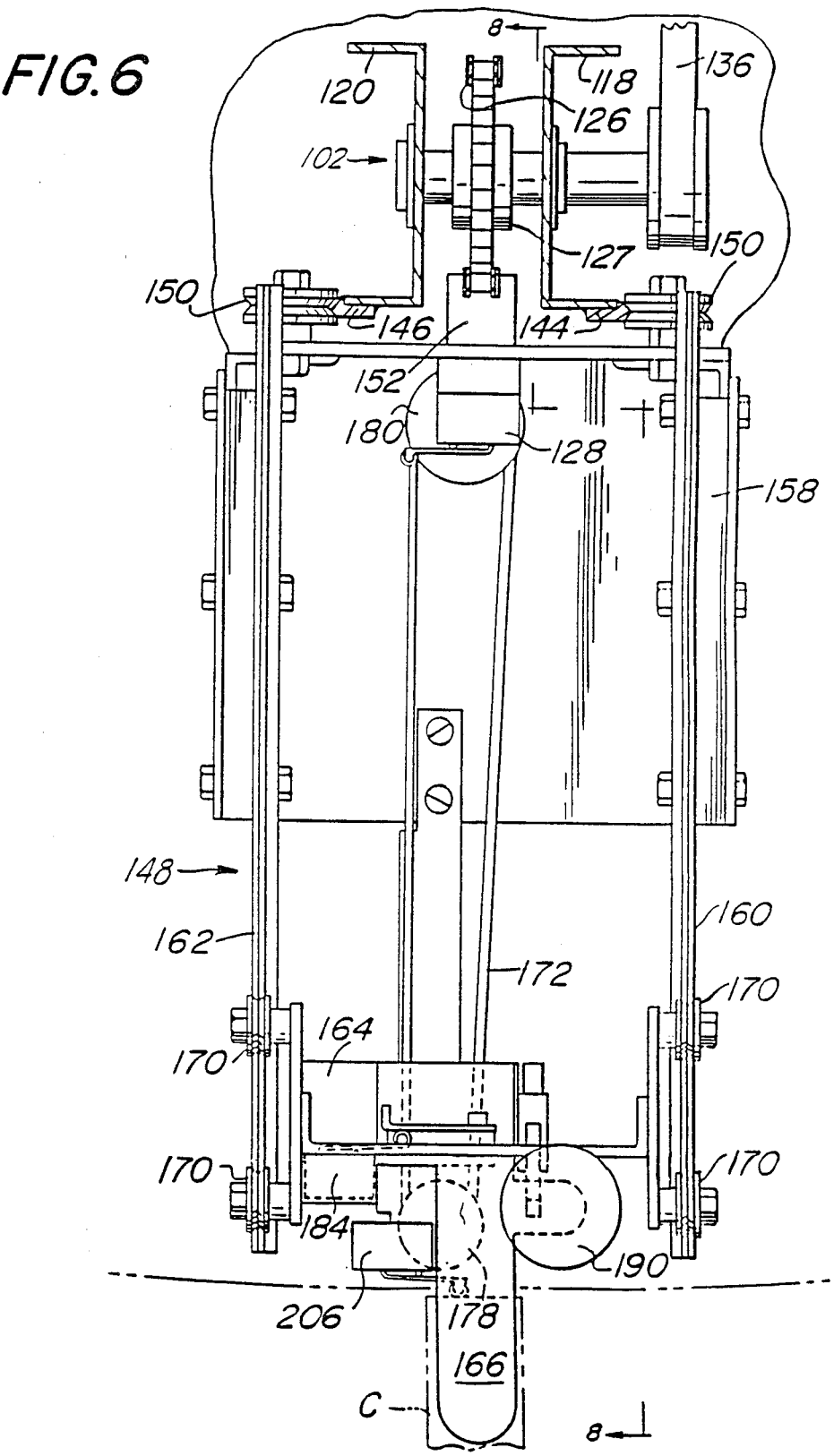
FIG. 6 is a sectional view taken along the lines 6—6 of FIG. 5.

As best seen in FIGS. 5 and 6, mast 102 comprises two back-to-back "U"-shaped channels 118 and 120 which are spaced apart by spacer blocks 122 and 124 (see FIG. 5). Additional spacer blocks (not shown) may be provided internally of mast 102. The mast 102 may alternatively be constructed of a single extruded member. In the space between channels 118 and 120 is located an endless chain 126 which passes around a drive sprocket 128 near the bottom of mast 102 and an idler sprocket 130 near the top of mast 102. Drive sprocket 128 is in turn driven by a DC electric motor 132 via appropriate reduction gearing in gear box 134 and timing belt 136. Motor 132 is mounted on gear box 134, which in turn is mounted on mast 102 for movement with it. A shaft encoder (not shown) on the shaft of motor 132 is provided to generate output pulses which represent the revolution of the motor shaft, and which are processed in CPU 38 to provide a signal indicative of the linear movement of chain 126 within mast 102.

Also mounted adjacent the bottom of mast 102 is a second DC electric motor 138 which drives a spur gear 140 via appropriate reduction gearing in gear box 142. Motor 138 is mounted on gear box 142, which in turn is mounted on mast 102 for movement with it. Spur gear 140 meshes with sun gear 110, so that as spur gear 140 is driven by motor 138, the entire mast assembly 102 revolves around axis 104. As with motor 132, the shaft of motor 138 is equipped with a shaft encoder (not shown) which generates pulses indicative of the revolution of the shaft motor 138, and which are processed in CPU 38 to generate signals representative of the angular position of the mast about axis 104. The angular position of the mast, and revolution of the mast, are referred to as the $\theta$ position and the $\theta$ movement.

As with all DC motors, motors 132 and 138 can be driven in either direction, depending upon the polarity of the applied voltage. Motors 132 and 138 can also be driven at fast or slow speeds depending upon the amplitude of the applied voltage.

Figure 7:
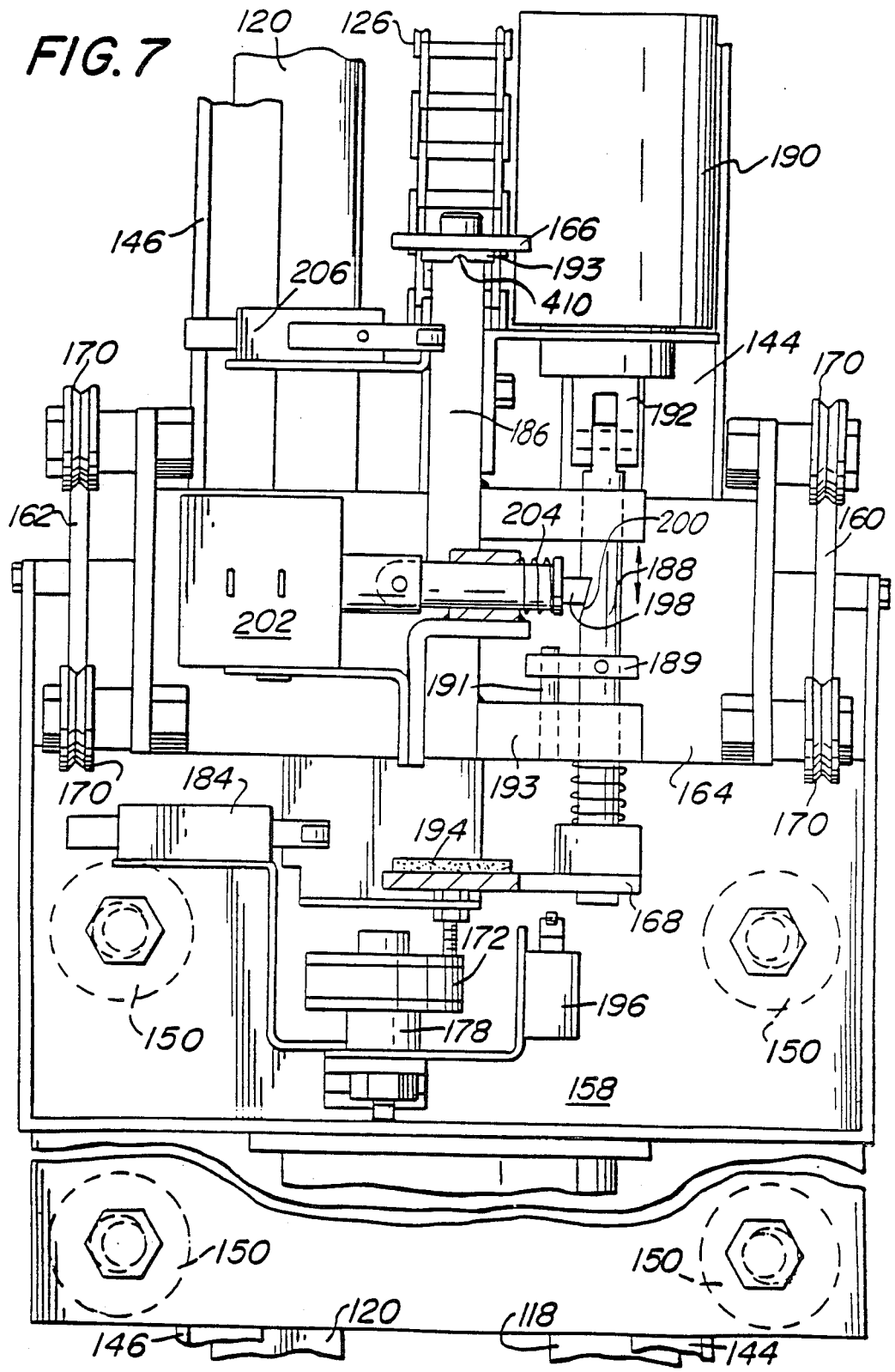
FIG. 7 is a sectional view taken along the lines 7—7 of FIG. 5.

Motors 132 and 138 are preferably mounted on the same side of mast 102. On the opposite side of mast 102, channels 118 and 120 are provided with rails 144 and 146, respectively, which extend the entire height of mast 102. A "picker" assembly 148 is mounted for movement on rails 144 and 146 by means of grooved wheels 150. It will be noted that two pairs of wheels 150 are provided on either side of mast 102, so that picker assembly 148 grips mast 102 firmly. As shown in FIG. 7, wheels 150 may be mounted eccentrically to facilitate assembly of picker 148 onto rails 144 and 146 and to adjust for a firm grip on mast 102. The entire picker assembly 148 is attached to chain 126 by bracket 152 so that as chain 126 moves linearly up and down within mast 102, picker assembly 148 will be moved from top to bottom of mast 102 along rails 144 and 146. The movement of picker assembly 148 up and down on mast 102 is referred to as movement in the z direction.

Although they have been omitted from the drawings for clarity, limit switches are provided at the top and bottom of mast 102 to indicate the extreme positions of travel of picker assembly 148 up and down with respect to mast 102. Limit switches are also provided at the extreme clockwise and counterclockwise θ-positions of transport means 100.

Additional limit switches, omitted from the drawings for clarity, are provided to indicate when the picker assembly 148 is in a reference, or "home" position in both the z and θ directions. A preferred home position is adjacent customer access door 28.

It will be appreciated from the foregoing that the videocassette transport means 100 is capable of movement in both θ and z directions. Thus, the picker assembly 148 can be positioned at any location which can be defined by (θ, z) coordinates. Since the videocassette storage means is arcuate in shape and extends from top to bottom of shell 14, each storage location within the videocassette storage means can be identified by a (θ, z) coordinate. Hence, picker assembly 148 can be located adjacent any storage location in the videocassette storage means by directing picker assembly 148 to move to the appropriate (θ, z) coordinates for that storage location.

In order to smooth out the movement of the picker assembly 148 as it moves up and down on mast 102, a counterweight 154 in the form of a coil spring and cable 156 is provided. The extreme end of cable 156 is attached to the carriage 158 of picker assembly 148, while the other end is attached to counterweight 154. Counterweight 154 provides a restraining force against the force of gravity as picker assembly 148 is moving downwardly, and applies an assisting force against the force of gravity as picker assembly 148 moves upwardly. This enables the picker assembly 148 to move smoothly up and down on mast 102.

Figure 8:
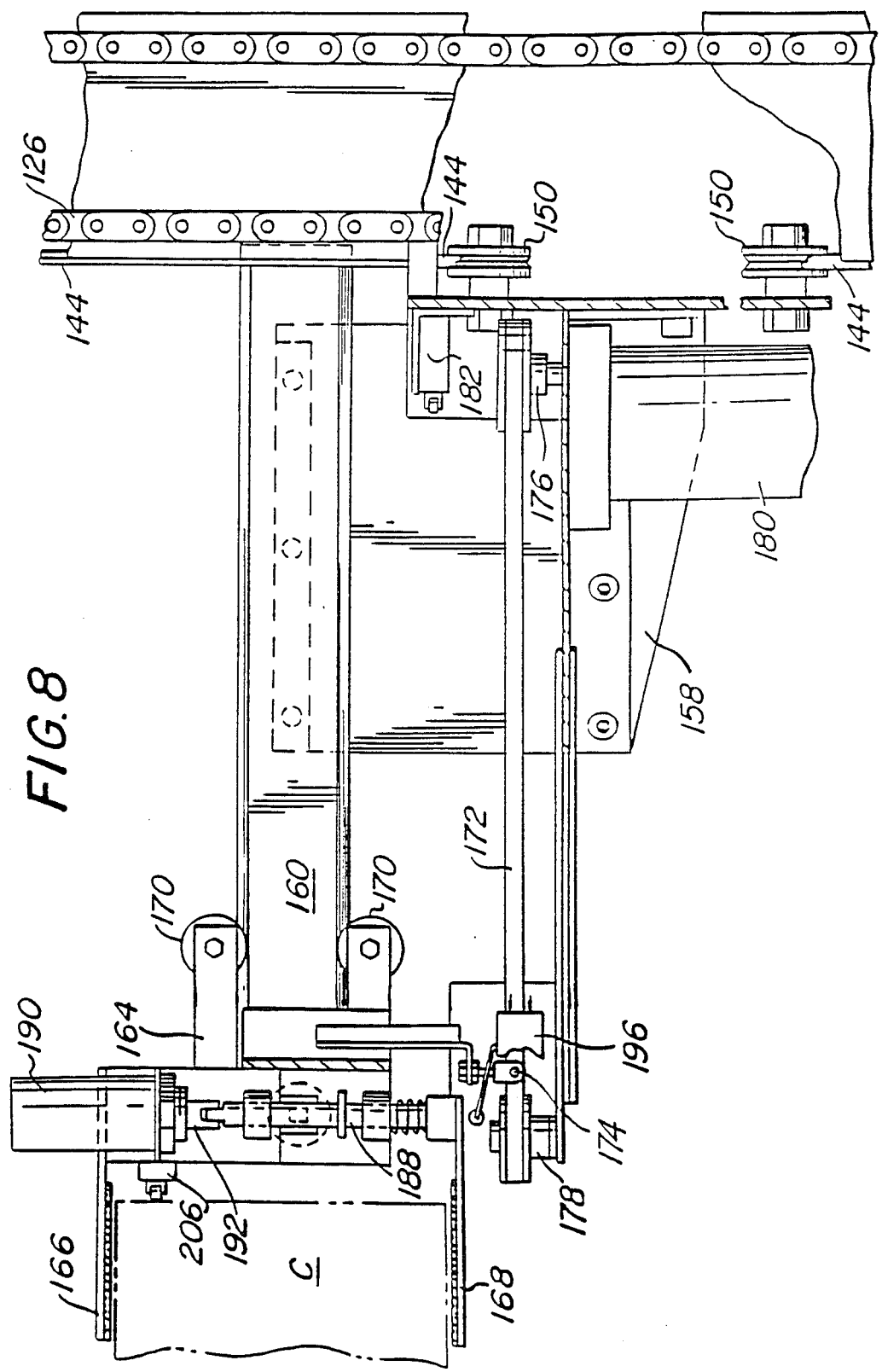
FIG. 8 is a sectional view taken along the lines 8—8 of FIG. 6.
Figure 10A:
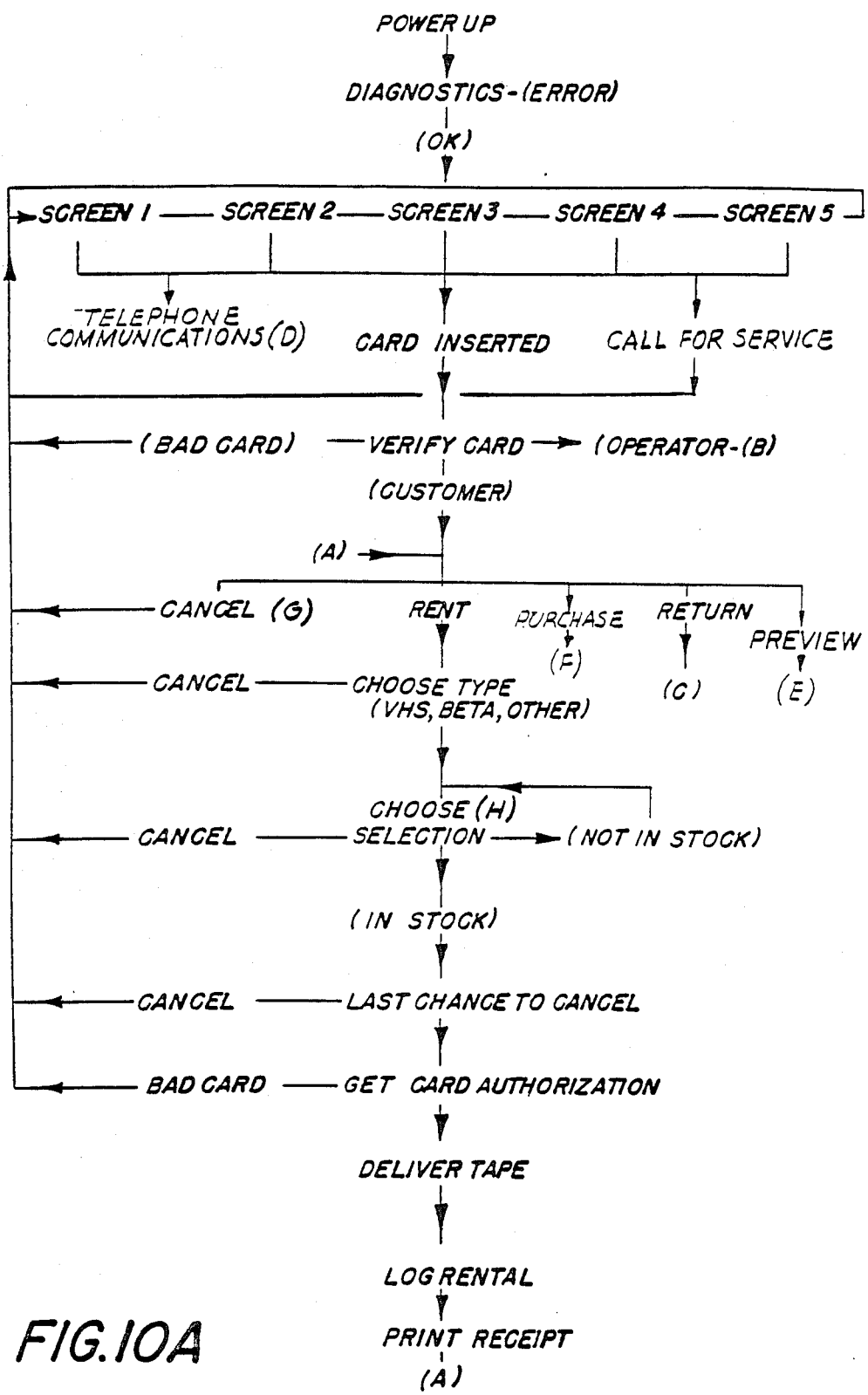
FIGS. 10A–10F are flow charts illustrating the operation of the apparatus of the present invention.
Figure 10B:
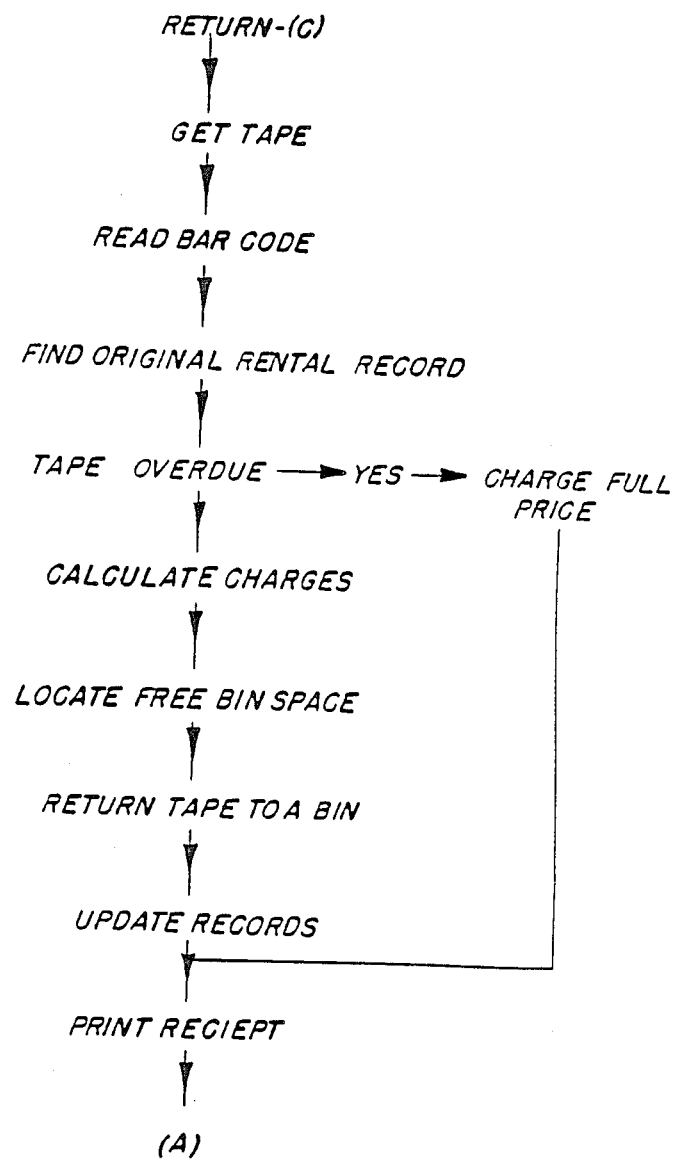
Figure 10C:
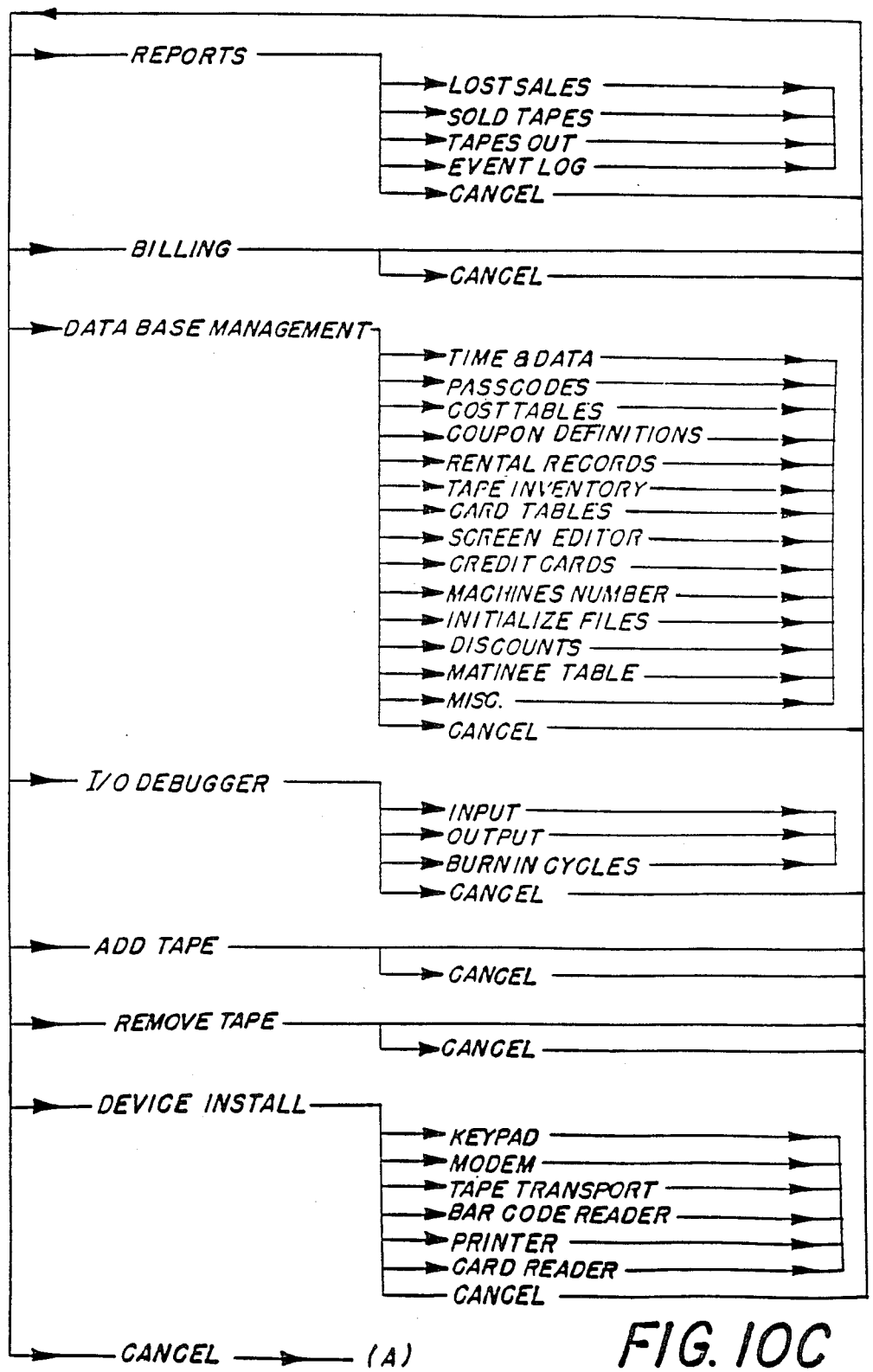
Figure 10:
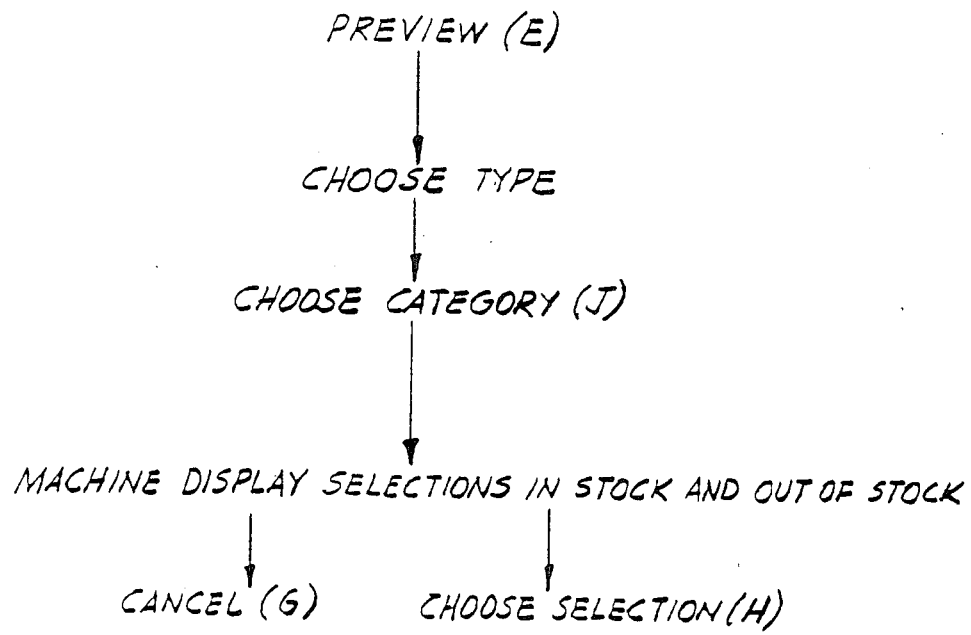
Figure 10E:
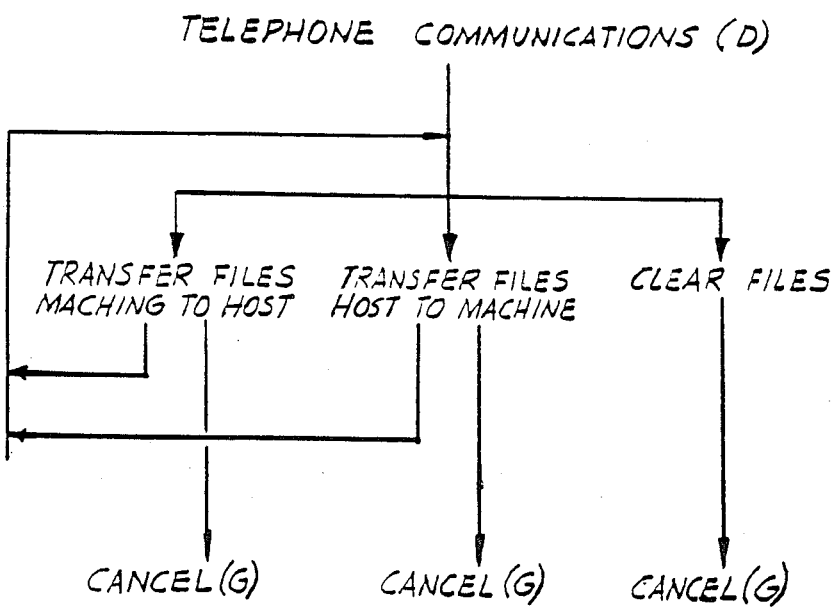
Figure 10F:
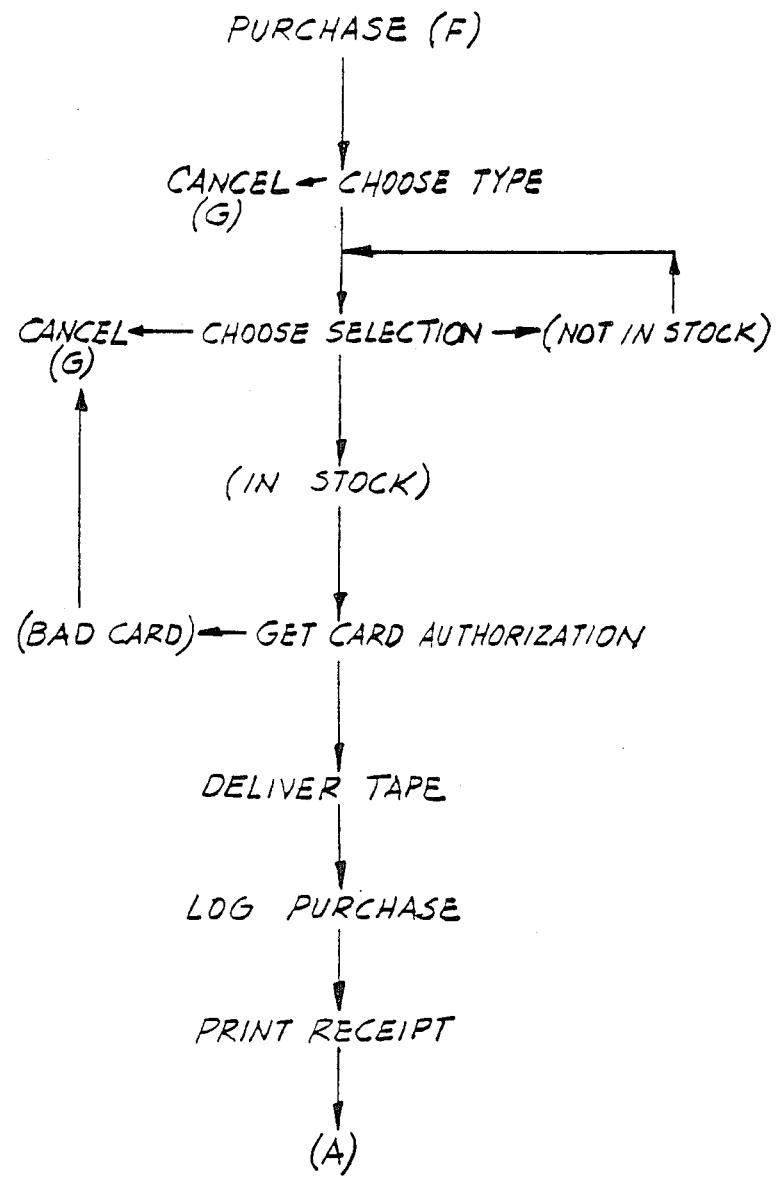

As can be seen in FIGS. 5, 6 and 8, picker assembly 148 consists of a carriage 158 which supports a pair or rails 160 and 162 which extend perpendicularly from mast 102. Mounted on rails 160 and 162 is a second carriage 164 which carries picker fingers 166 and 168, to be described in greater detail below. Carriage 164 is mounted on rails 160 and 162 by grooved wheels 170 which ride on the edges of rails 160 and 162. Four pairs of wheels 170, two pairs above and two below rails 160 and 162, are provided so that carriage 164 grips the top and bottom of rails 160 and 162 for a rigid mount. Wheels 170 are eccentriacally mounted, as wheels 150, for the same reasons. Carriage 164 is attached to a carriage drive belt or timing belt 172 at location 174. Belt 172 is an endless belt which passes around drive pulley 176 and idler pulley 178. Drive pulley 176 is driven by DC electric motor 180 mounted on carriage 158. As the shaft of motor 180 rotates, belt 172 moves linearly in a direction perpendicular to mast 102 and parallel to rails 160 and 162. Thus, as belt 172 moves linearly, carriage 164 moves toward and away from mast 102, depending upon whether motor 180 is driven in the forward or reverse directions. This movement of carriage 164 with respect to mast 102 is referred to as a movement in the r direction. It will be appreciated that the precise position of carriage 164 can therefore be defined by cylindrical coordinates (r, θ, z). That is, carriage 164 can be located at any point which can be defined by cylindrical coordinates.

The extreme positions of carriage 164 on rails 160 and 162 is sensed by limit switches 182 and 184. Limit switch 182 indicates when carriage 164 is retracted, i.e., at its extreme position closest to mast 102, while limit switch 184 indicates when carriage 164 is extended, i.e., at its extreme outer position. At all times, carriage 164 will be at either of these positions or in transit between these two positions.

Operation of picker assembly 148 in grasping a videocassette for transport can best be understood by reference to FIG. 7. Picker assembly 148 comprises a pair of picker fingers 166 and 168 for grasping videocassette C which is to be transported by videocassette transport means 100. Picker finger 166 is mounted at one end of a bracket 186 so that picker figner 166 remains stationary with respect to carriage 164. Picker finger 166 is mounted on a rod 188 for up and down movement with respect to carriage 164. Up and down movement to rod 188, and thus picker finger 168, is imparted by a solenoid 190, whose shaft 192 is attached to rod 188. When solenoid 190 is energized, the solenoid shaft 192 retracts, causing rod 188 and picker finger 168 to move upwardly. Thus, when solenoid 160 is actuated, a videocassette C can be gripped by fingers 166 and 168. Fingers 166 and 168 may be lined with friction pads 192 and 194 to help grip videocassette C. Rod 188 can be kept from rotating, thus preventing finger 168 from pivoting, by attaching to rod 188 a collar 189 arranged to receive a pin 191 fixed in guide block 193. Pin 191 constrains collar 189 to move up and down without rotating, thus preventing rod 188 from rotating as well.

A limit switch 196 indicates when picker finger 168 is at its extreme lower position. Thus, the state of limit switch 196 (on or off) indicates whether the picker fingers 166 and 168 are open or closed.

As already noted, when solenoid 190 is energized, picker finger 168 is moved upwardly into the closed position to grip videocassette C between fingers 166 and 168. Finger 168 may be held in the gripping position by means of a latching bar 198 which cooperates with a notch 200 in rod 188. Latching bar 198 is moved reciprocally toward and away from rod 188 by a solenoid 202. Solenoid 202 is normally de-energized, so that latching bar 198 is urged toward rod 188 by coil spring 204. As will be appreciated from FIG. 7, when solenoid 202 is de-energized, rod 188 may move upwardly without restraint, so that picker finger 168 may be moved to the gripping position. Once finger 168 is in the gripping position, however, latching bar 198 enters notch 200, and holds finger 168 in the gripping position. Latching bar 198 will not release finger 168 unless solenoid 202 is energized to retract latching bar 198. This provides a safety feature in the event of an unexpected interruption of machine power, so that in the event videocassette transport means 100 is in the act of moving a cassette from one location to another, de-energization of solenoid 190 will not allow finger 168 to be released and drop the videocassette.

Also mounted on carriage 164 is a limit switch 206 for sensing whether or not a cassette is present in picker mechanism 148. Limit switch 206 provides an indication of whether or not a videocassette C is present and properly seated with respect to picker fingers 166 and 168. This provides an additional safety feature so that, when transporting a cassette, videocassette transport means 100 will only be actuated if a videocassette C is properly seated in finger assembly 148.

A unique feature of videocassette transport means 100 is that it can be self-calibrating each time videocassette vending machine 10 is powered up. Each time the machine 10 is turned on, the CPU causes picker assembly 148 to move to its extreme z and $\theta$ positions ($\theta_{cw}$ max, z min), ($\theta_{cw}$ max, z max), ($\theta_{ccw}$ max, z max) and ($\theta_{ccw}$ max, z min) and then return to its "home" position. As picker assembly 148 moves from position to position and then home, CPU 38 counts the number of pulses generated by the shaft encoders on motors 132 and 138 between each position. The number of pulses, which correspond to the distance between extremes of z and $\theta$ positions, are stored for reference. These reference pulses are used by CPU 38 when generating ($\theta$, z) commands to transport means 100. In this way, videocassette transport means 100 can be made insensitive to changes in the number of pulses between extreme positions which may result from manufacturing tolerances, wear and tear, chain stretch, and the like. Transport means 100 calibrates itself, rather then requiring an operator to calibrate it manually.

Referring now to FIG. 9, customer access door 28 is shown in greater detail. Access door 28 is pivoted about an axis 208 which extends vertically, i.e., parallel to the z axis of videocassette transport means 100. Access door 28 is provided with a front panel 210 which has a peripheral edge portion 212 which acts as a limit stop in cooperation with the edges of openings 214 in door 16. Access door 28 has a handle portion 216 into which a customer may insert his fingers to open access door from the closed position (shown in solid in FIG. 9) to the open position (shown in phantom in FIG. 9).

Access door 28 has a videocassette receiving cavity 218 into which a videocassette is inserted either by picker mechanism 148 for dispensing or by the customer when a videocassette is to be returned. Scanner 30 is mounted on one wall of cavity 218, and is arranged to view through opening 219 the identifying bar code on a videocassette being inserted into cavity 218, either by the picker 148 when dispensing or by the customer when returning a videocassette. Although not shown in FIG. 9, a sensing switch can be located in receiving cavity 218, preferably along the back wall thereof, which is closed upon insertion of a cassette and which provides a signal to CPU 38 that a cassette has been inserted in access door 28.

Also omitted from FIG. 9 is a locking solenoid which locks access door 28 in the closed position when the machine 10 is not dispensing or accepting videocassettes. When a videocassette is to be dispensed or returned, the locking solenoid is energized to release door 28, so that it can be opened by the customer for removal or insertion of videocassettes.

As seen in FIG. 9, access door 28 is adapted so that the axis of receiving cavity 218 will be radial with respect to transport means 100. This facilitates the ability of picker mechanism 148 to insert and remove videocassettes in cavity 218. It can also be seen from FIG. 9 that the structure of customer access door 28 makes it virtually impossible for a customer to insert his fingers or any foreign object into machine 10 through opening 214. Access door 28 is provided with a guard flange 220 which effectively closes opening 214 when the access door 28 is fully open.

Access door 28 may also be provided with a mechanical keying arragement within receiving cavity 218, so that only appropriately keyed videocassettes and/or its travel case will fit into receiving cavity 218. If a non-keyed videocassette is attempted to be inserted, access door 28 cannot be closed. Videocassettes are customarily rented in protective boxes, i.e., travelling case. When access door 28 is provided with mechanical keying means, as to be described hereinafter, mating means will necessarily need to be provided on the videocassette box. By so keying customer access door 28 and the videocassette box, only appropriately keyed videocassettes can be returned to the machine. Thus, this prevents the return of a different videocassette in place of the one rented.

As an additional check on the identity of the videocassette being returned, each videocassette is provided with a unique code, such as a bar code, as described above. The protective box is provided with a transparent window, or may be made entirely transparent itself, so that the identifying bar code on the videocassette can be scanned by scanner 30 once a properly keyed videocassette is inserted into machine 10 via customer access door 28.

Operation of the videocassette vending machine can be readily understood with reference to the block diagram of FIGS. 10A-10F.

When machine 10 is powered up, CPU 38 first executes a pre-programmed diagnostics routine to be certain that machine 10 and all of its subsystems are properly operating. If an error or malfunction is found, an error message is displayed to the operator. The error must be located and corrected before the machine is available for operation by a customer. If the results of the diagnostic routine indicate that the machine 10 and all of its subsystems are properly functioning, CPU 38 commands CRT 24 to sequentially display a pre-programmed number of different screen. As an example, screen 1 may display a message such as "THE MACHINE IS READY TO TAKE YOUR PURCHASE OR RENTAL ORDER—INSERT CREDIT CARD". Screen 2-5 may be programmed by the owner/operator to display any desired message, such as a feature of the week, new films available, and so on. If a customer wishes to make a purchase or rental from the machine, he inserts his card into card reader 18. CPU 38 will then execute a card verification routine to determine whether the inserted card is a customer's card or an operator's card. If a customer's card, CPU will also determine whether the inserted card is one that is accepted by the owner and ies not a card excluded for a reason such as an overdue account, exceeding the maximum number of open rentals, or the like. While this routine is being carried out, CPU 38 causes CRT 24 to display an appropriate message, such as "VERIFYING YOUR CREDIT CARD-PLEASE WAIT".

If the credit card is unacceptable for any reason, CPU 38 exits the main program loop and returns to the sequential display of the various screens on the CRT 24. If the card inserted into card reader 18 is the operator's access card, CPU 38 exits the main program loop and enters subloop B. In this subloop, the operator can instruct CPU 38 to prepare the various reports such as lost sales, sold videocassettes, videocassettes out, and the like, carry out billing functions; execute data base management functions whereby the data bases discussed above may be re-programmed; carry out debugging routines; accept the addition of videocassette to be stored in the machine; dispense videocassettes to be removed from the machine; and so forth. At any time in subloop B, the operator may cancel and return to point A in the main program loop.

If the credit card inserted in the credit card reader 18 is a customer credit card, CPU 38 will prompt the customer to select the desired transition, e.g., purchase, rent or return videocassettes. CRT 24 may display a message such as:
"PLEASE PRESS:
PURCHASE
RENT
RETURN
CANCEL
PREVIEW"

If the customer chooses to cancel his transaction, CPU 38 exits the loop and returns to the sequential screen display. If the customer chooses to purchase or rent a videocassette, he presses the appropriate mode selection push-button 20. CPU 38 will then prompt the customer to chose the type of videocassette to be dispensed, e.g., VHS, Beta or other. For example, CRT may display a message such as "PRESS 1 FOR VHS— PRESS 2 FOR BETA".

After the customer selects the type of videocassette, the CPU 38 prompts the customer to enter the selection number of the desired videocassette by means of key pad 22. CRT 24 may display a meassage such as "PLEASE ENTER YOUR SELECTION NUMBER". After the selection number is entered, CPU 38 consults the videocassette inventory data base to determine whether the desired selection is available for purchase or rental. If it is not, CPU 38 may display an appropriate message and prompt the customer to make an alternate selection. At this point, the customer can cancel the transaction by pressing the appropriate mode select push-button.

If the desired videocassette is in stock, CPU 38 can be programmed, at the operator's discretion, to display a message such as "YOUR SELECTION IS IN STOCK. THIS IS YOUR LAST OPPORTUNITY TO CANCEL THE TRANSACTION. PRESS PURCHASE [or RENT, as appropriate for desired transaction] TO CONFIRM THE TRANSACTION. PRESS CANCEL TO CANCEL THE TRANSACTION."

At this point in the main loop of the program, CPU 38 obtains the authorization to charge the transaction to the customer's credit card account by communicating with the credit card company by means of modem 36. This can be done automatically by linking videocassette vending machine 10 to the host processor of the credit card company.

If the desired videocassette is not in stock, the program gives the customer, if the customer selects, the option to preview selections that are in stock in the videocassette vending machine 10 at the present time. Alternatively, the customer can choose to preview immediately after the credit card has been inserted. A preview (E) program (see FIG. 10D) has the customer choose the type of film (i.e, such as comedy, drama, horror, etc.) desired. The preview program (E) then displays the selections and selection numbers of that type of film stocked in the vending machine 10, highlighting those selections presently in stock. Alternately, the preview program (E) can list only those selections in stock at the time. The customer can then select a movie for purchase or rental, or cancel the transaction.

Once authorization is obtained, the transport means 100 is actuated under control of CPU 38. CPU 38 obtains from the videocassette inventory table the ($\theta$, z) coordinates of the videocassette selected. The picker mechanism 148 at this point will be in the home position. CPU 38 then calculates the number of shaft encode pulses from motors 132 and 138 required to move picker mechanism 138 from its home position to the ($\theta$, z) coordinates of the selected videocassette. Motors 132 and 138 are then energized in the "fast" mode and picker mechanism 148 is moved inn the z and $\theta$ directions at high speed toward the ($\theta$, z) coordinates of the selected videocassette. When the picker mechanism 148 is within a predetermined number of shaft encoder pulses of ts final ($\theta$, z) coordinate destination, the motors 132 and 138 are energized at the "slow" speed until the pulses from the shaft encoders indicate that the picker mechanism has reached the ($\theta$, z) coordinate destination.

When picker mechanism 148 reaches this location, motor 180 is energized to extend picker mechanism 148 from its retracted positionn to its fully-extended position, as shown in FIG. 5. When picker mechanism 148 reaches its fully extended position, as indicated by closure of switch 184, and when the presence of a videocassette between picker fingers 166 and 168 is indicated by closure of switch 206, solenoid 190 is energized, thereby closing fingers 166 and 168. When finers 166 and 168 are closed, as indicated by the opening of switch 196, picker assembly 148 is retracted to its fully-retracted position, and motors 132 and 138 are energized to cause transport 100 to convey the selected videocasette to the ($\theta$, z) coordinates of the customer access door 28.

When the shft encoders associated with motors 132 and 138 indicate that the picker mechanism has reached the customer access door 28, picker mechanism 148 is again extended to its fully-extended position, thereby placing the selected videocassette in the cavity 218 customer access door 28. Latch 198 is released, finger 168 drops and the videocassette is released by picker mechanism 148.

When the videocassette is fully seated in customer access door 28, as indicated by closure of a switch (not shown in the drawings), picker assembly 148 is retracted and is returned to its home position. Simultaneously, the locking solenoid for access door 28 is unlatched, and access door 28 is free to pivot outwardly to dispense the desired cassette to the customer. Also simultaneously, a rental receipt is printed by printer 26.

After the purchase or rental transaction is completed, CPU 38 returns to point A in the main program loop and is available for another transaction. If no further transaction is desired, the customer simply presses "CANCEL", and CPU 38 returns to the sequential display of the various screens. If the customer desired to purchase or rent an additional videocassette or videocassettes, the above-described sequence is repeated. The above-described sequence can be repeated as often as desired up to a predetermined maximum number of times set by the owner/operator.

To return videocassettes, the customer inserts his credit card as described above and, after his card is verified, presses the "RETURN" mode selection pushbutton. When the return mode is selected, CPU 38 goes to subloop C of the program, and displays, if desired by the operator, an appropriate message to the customer such as:
"TO RETURN A VIDEOCASSETTE
1. PLACE VIDEOCASSETTE AS SHOWN IN RETURN BIN
2. PRESS RETURN BUTTON AGAIN"
At that point, a message may be displayed asking the customer to press a key indicating if the videocassette is in good condition or may have been damaged during rental. If the customer indicates a problem with the returned videocassette, the inventory data base can be updated and the videocassette can be flagged to prevent further rental.

When the customer inserts the videocassette in the customer access door 28 and closes the door, the returned videocassette and/or its travelling case is scanned by scanner 30 and the videocassette is identified. CPU 38 then obtains from memory the original rental record corresponding to the returned videocassette. The rental charges for the videocassette are calculated and charged to the customer's credit card account.

Simultaneously, CPU 38 consults the inventory table to locate the empty available storage location in the storage means closest to the home position of picker assembly 148. The closest available storage position is chosen to minimize transport means cycle time. Picker assembly 148 is then moved to customer access door 28 where it grips the returned videocassette, and is then moved to the ($\theta$, z) coordinates of the available storage location, where it inserts the returned videocassette. After inserting the returned videocassette, picker mechanism 148 returns to the home position. Simultaneously, the inventory table and other records are updated to reflect return of the videocassette. Finally, a receipt is printed for the customer. CPU 38 then returns to point A in the main program loop, where the machine is available for additional transactions. If no further transactions, such as further returns or rentals, are to be carried out, the operator presses CANCEL, and CPU 38 returns to the sequential display of the various screens.

If a videocassette being returned is not acceptable for any reason (e.g., the CPU 38 has no record of the videocassette or its travelling case, or the videocassette was not rented from the machine), the videocassette is placed in a storage location and a message and/or printed coupon is generated, advising the customer that the tape is not acceptable and providing a telephone number for the customer to call for service. The storage location is also flagged in the machine inventory data base to prevent the unacceptable tape from being vended or rented.

In addition to the ability of placing returned videocassettes to any available empty storage location in the storage means 40, videocassette vending machine 10 has the ability to stock itself. This enables an owner/operator or his clerk to simply insert the videocassettes to be stored into videocassette vending machine 10 via customer access door 28. Videocassette vending machine 10 will automatically scan the videocassettes and note which videocassettes are inserted, and will place them in available empty storage locations and store those locations in memory. This means that the owner/operator does not need to enter the identity of the videocassette and its stored location individually into memory units 34.

When a videocassette to be stored is inserted into the machine via customer access door 28, it is scanned by scanner 30, and the identity of the videocassette is stored in memory. Videocassette transport means 100 then transports the videocassette from the customer access door to the available empty storage location closest to its "home" position. The ($\theta$, z) coordinates of this storage location are then stored in memory along with the identification of the cassette. This process is repeated for each cassette to be stored in the machine. Thus, all the owner/operator need do to store videocassettes is insert them into the machine. This minimizes the chance of operator error in manually entering videocassette identificationn information and storage location in the inventory data base.

It will be appreciated that the design of the transport means and storage means and the software controlled operation of the machine (e.g., the ability of the machine to place a returned cassette to any available storage location) enable the machine to operate at much lower cycle times than prior machines. This not only saves the customer's time, but maximizes machine throughput and, hence, revenues generated by the machine. It will also be appreciated that the design of transport means 100 provides for greatly simplified assembly, maintenance and repair, all of which enable the machine to be made and operated at lower cost than prior machines.

The videocassette vending machine 10 has thus far been described with respect to a particular construction and mode of operation, as illustrated in and described with reference to FIGS. 1-10A-F. There will now be presented various other modifications of the videocassette vending machine 10 and its mode of operation in accordance with other embodiments and aspects of the present invention. To this end, the reader's attention is directed to FIGS. 11-12 which disclose the construction of a protective travel case 300 and the manner of its return to the videocassette vending machine 10. The travel case 300 is generally constructed to open and receive the videocassette C or other such product being purchased or rented as is generally known.

The travel case 300 is provided with an elongated transparent window 302 formed within a portion of side wall 304. An upper wall 306 is provided with a longitudinally extending, upwardly projecting configured spline 308. The spline 308 begins adjacent end wall 310 while window 402 begins adjacent end wall 312. A longitudinally extending flange 314 extends upwardly from the upper wall 306 in generally co-planar alignment with the rear side wall 314, as best shown in FIG. 12. The rear side wall 314 functions as an openable cover for the travel case 300 to permit access to the interior thereof for storage of a videocassette C or other such product. The flange 314 terminates adjacent the terminating portion of the spline 308 to provide uninterrupted engagement of the spline as to be described hereinafter. The side wall 304 terminates adjacent the planar surface of the upper wall 306, i.e., the absence of a corresponding flange 314.

As shown in FIG. 12, end wall 312 is provided with a plurality of openings 318 arrangable in any devised pattern or configuration. In accordance with one embodiment, the openings 318 are arranged two adjacent the upper portion of the end wall 312 and a single opening is arranged adjacent the lower portion of the end wall. These openings 318, as well as the flanges 314, provide the travel case 300 with a unique personalized construction which is different in kind from conventional travel cases heretofore known for videocassette C. This unique construction, as to be described, provides that only a travel case 300 rented from a particular videocassette vending machine 10 can be accepted back into that machine upon rental return regardless of what was, what is, or what is not inside the travel case, i.e., videocassette C.

Referring to FIGS. 13 and 14, a modified form of access door 28, in accordance with another embodiment of the present invention, is shown. The receiving cavity 218 is provided with an end wall 320 from which there protrudes inwardly three projecting cylindrical pins 322. The pins 322 are arranged in alignment with the openings 318 provided within the travel case 300 so as to be received therein. Full insertion of the travel case 300 within the receiving cavity 218, as well as its stored videocassette C, cannot be achieved unless the openings 318 are keyed to the corresponding positions of the pins 322. In other words, the provision and keyed arrangement of the openings 318 and pins 322 ensure that a particular travel case 300 being vended from a particular videocassette vending machine 10 can only be returned to that machine. Each videocassette vending machine 10 may employ any number of pins 322 or other such members, which are arrangable in any particular configuration so as to distinguish travel cases 300 emanating from different machines.

In addition, a side wall 324 forming the receiving cavity 218 can be provided with a longitudinally extending horizontal flange 326 arranged at its upper edge, as shown in FIG. 13. As previously described, the travel case 300 is provided with a single flange 314 extending upward from upper wall 306 in generally co-planar alignment with rear side wall 316. The opposing side wall 304 terminates flush with the surface of the upper wall 306. As a result of this construction, flange 326 rides uninterrupted over the surface of upper wall 306 upon insertion of the travel case 300 within the receiving cavity 218. The provision of the flange 326 and the absence of a corresponding flange 314 extending from side wall 304 permits the full insertion of the travel case 300 within the receiving cavity 218. On the other hand, conventional travel cases having a pair of upstanding flanges 314, would be prevented from being inserted within the receiving cavity 218 by means of engagement of flange 326 with an upstanding flange 314 provided on the conventional travel case. This construction of the travel case 300 further prevents unauthorized travel cases, such as those commercially purchased or rented from video stores from being returned to the videocassette vending machine 10.

The return of the travel case 300 containing a videocassette C to a videocassette vending machine 10 is accomplished in the following manner. The customer initially inserts his credit card, club card or the like, into the card reader 18, as previously described. The customer is then informed by the CRT display 24 to press the return mode selection push button 20 in order to activate the videocassette vending machine 10 via CPU 38 so as to enable return of the rented videocassette. Upon the customer pressing the return mode selection switch 20, the videocassette vending machine 10 will initially begin to beep, the CRT display 24 will display a message to inform the customer to open the access door 28, which access door will then be locked in the open position as shown in FIG. 13. The videocassette vending machine 10 will continue beeping until the travel case 300 is fully inserted into the receiving cavity 218, at which time the beeping will cease.

In the case of an attempted return of a travel case 300 from an unauthorized source, i.e., different videocassette vending machine 10, the insertion of the travel case will be prematurely stopped by engagement of its end wall 312 with the plurality of misaligned projecting pins 322. The position of the travel case 300, in this event, will be as generally shown in FIG. 14. The inability to further insert the travel case 300 within the receiving cavity 218 prevents activation and operation of the videocassette vending machine 10. In other words, the videocassette vending machine 10 does not reject the travel case 300 as being unacceptable, rather, the videocassette vending machine merely remains inactive, keeps beeping, and does not begin its programmed operation, thereby necessitating customer removal of the travel case 300 from the access door 28 which remains locked in its opened position. The travel case 300 is provided with a travel case bar code 328 adhered to the inside of the window 302 at the approximate location designated in FIGS. 13 and 14. Similarly, a videocassette bar code 330 is adhered to the contained videocassette C at a location adjacent the travel case bar code 328, also in registration with the window 302. As shown, the insertion of an unacceptable travel case 300 within the receiving cavity 218 precludes the scanner 30 from fully reading the travel case bar code 328. In this event, the videocassette vending machine 10 will not begin its programmed operation, thereby precluding return of the travel case 300 and its contained videocassette C. On the other hand, upon insertion of an acceptable travel case 300, the pins 322 will align with and be received within the openings 312 to permit full insertion of the travel case within the receiving cavity 218. In this event, as the travel case 300 is fully inserted into the receiving cavity 218, the travel case bar code 328 visible to the exterior through window 302, will pass across bar code scanner 30 which will read the bar code and transmit the information to the CPU 38. The CPU 38 will determine whether the inserted travel case 300 is an authorized travel case by having originated from that particular videocassette vending machine 10. Upon detecting an authorized travel case 300, the CPU 38 will activate the videocassette vending machine 10 to set the picker assembly 148 into operation to receive the travel case 300 and its contained videocassette C into the machine. The acceptance of the travel case 300 into the videocassette cassette vending machine 10 by means of the picker assembly 148 is independent as to what may or may not be contained within the travel case, i.e., videocassette C.

In the event the CPU 38 does not recognize the travel case 300, vis-a-vis the reading of travel case bar code 328 by scanner 30, as originating from that particular videocassette vending machine 10, the CPU 38 will not send out any signal to set the machine into operation and the activation of the picker assembly 148. Upon the videocassette vending machine's failure to activate, the beeping sound will appear once again and the CRT display 24 will advise the customer to remove the travel case 300 from the access door 28. The CRT display 24 may display a message that the machine is having difficulty recognizing the travel case 300 and to telephone a specific number for assistance to receive the proper credit for the security deposit previouslyd charged to the customer.

Whether or not a particular videocassette C rented from a particular videocassette vending machine 10 and contained within a particular travel case 300 is being returned to the proper machine, is determined in the following manner. When the customer inserts an authorized travel case 300 into the receiving cavity 218 of the access door 28, at that time the scanner 30 will read the travel case bar code 328 adhering to the inside of the windoe 302. The scanner 30 will subsequently read the videocassette bar code 330 adhering to the videocassette C through the same windoe 302 in the travel case 300. If the CPU 38 acknowledges the bar code reading on the videocassette C located within the travel case 300 to be the particular movie rented from that particular videocassette vending machine 10, the identity of the videocassette will be transmitted by the CPU 38 to the memory unit 34. The picker assembly 148, as previously described, will remove the travel case 300 from the receiving cavity 218 and place the travel case with the contained videocassette C in the next available videocassette storage location 50, 52 etc. provided within the storage means 40 for further re-rental. The customer would receive proper credit for the security deposit he was previously charged when renting the videocassette. Simultaneously, the inventory table and other records are updated to reflect return of the videocassette C.

In the event the CPU 38 recognizes the videocassette C as being different than the particular one rented, or determines that no videocassette C is within the travel case 300, the travel case with its contents, or lack of contents, would be placed in a storage area by means of the picker assembly 148 so as to prohibit further re-rental. The customer would then be informed on the CRT display 24 that the videocassette C returned was not recognized as that which was rented and would instruct the customer to call a particular telephone number of arrange proper credit for the security deposit paid. The customer would be issued a receipt that would further inform the customer that the receipt is conditional and that the customer must call a particular telephone number to arrange credit for the security deposit charged.

The provision of the above-described pins 322 and aligned opening 318 within a travel case 300 provides a means for mechanical rejection of an unauthorized travel case. In other words, the pins 322 must align and be received within the openings 318 in order to allow the scanner 30 to read the travel case bar code 328. Only then will the scanner 30 subsequently read the videocassette bar code 330. If the scanner 30 verifies the travel case bar code 328, the travel case 300 will be accepted regardless of whether there is a videocassette C inside or whether the videocassette C is the one previously vended from that particular videocassette vending machine 10. Upon verification of the travel case bar code 328, the picker assembly 148 is activated by the CPu 38, and the travel case 300 is received within the machine regardless of its contents. In other words, the picker assembly 148 is only activated upon verification that the travel case 300 originates from that particular videocassette vending machine 10.

Although the operation of the videocassette vending machine 10 has been described with respect to the provision of pins 322, it should be understood that these are an optional feature and are not required in the particular embodiment as thus far described. For example, the pins 322, which function as an initial mechanical rejection technique, may be eliminated in favor solely of the scanner 30 which initially reads the travel case bar code 328. In other words, as the travel case 300 is inserted into the receiving cavity 218, the scanner 30 will read the travel case bar code 328 and then either activate or allow the videocassette vending machine 10 to remain inactive. This activation of the videocassette vending machine 10 is not based on whether a particular videocassette C is or is not contained within the travel case 300. If the travel case 300 originated from that particular videocassette vending machine 10, it will be accepted for return. If the travel case 300 was originated from another videocassette vending machine 10, it would not be rejected, rather the machine would not become operational and the customer would be told to return the travel case 300 to the particular machine which the product presumably came from.

In the event the travel case 300 is accepted by the videocassette vending machine 10, the scanner 30 will then scan through the window 302 to read the videocassette bar code 330 adhering to the videocassette C. If the videocassette C is recognized as the exact movie rented from that particular videocassette vending machine 10, the travel case 300 and its contents would be replaced for re-rental, providing the customer with the proper credit to cancel the security deposit charged when the videocassette C was rented. In the event the scanning of the videocassette bar code 330 on the videocassette C reveals that the movie was not rented from that particular videocassette vending machine 10, the travel case 300 and its contents would be placed in storage, not to be used for re-rental, and the customer would not receive any credit towards his security deposit charged at the time of rental.

Figure 17:
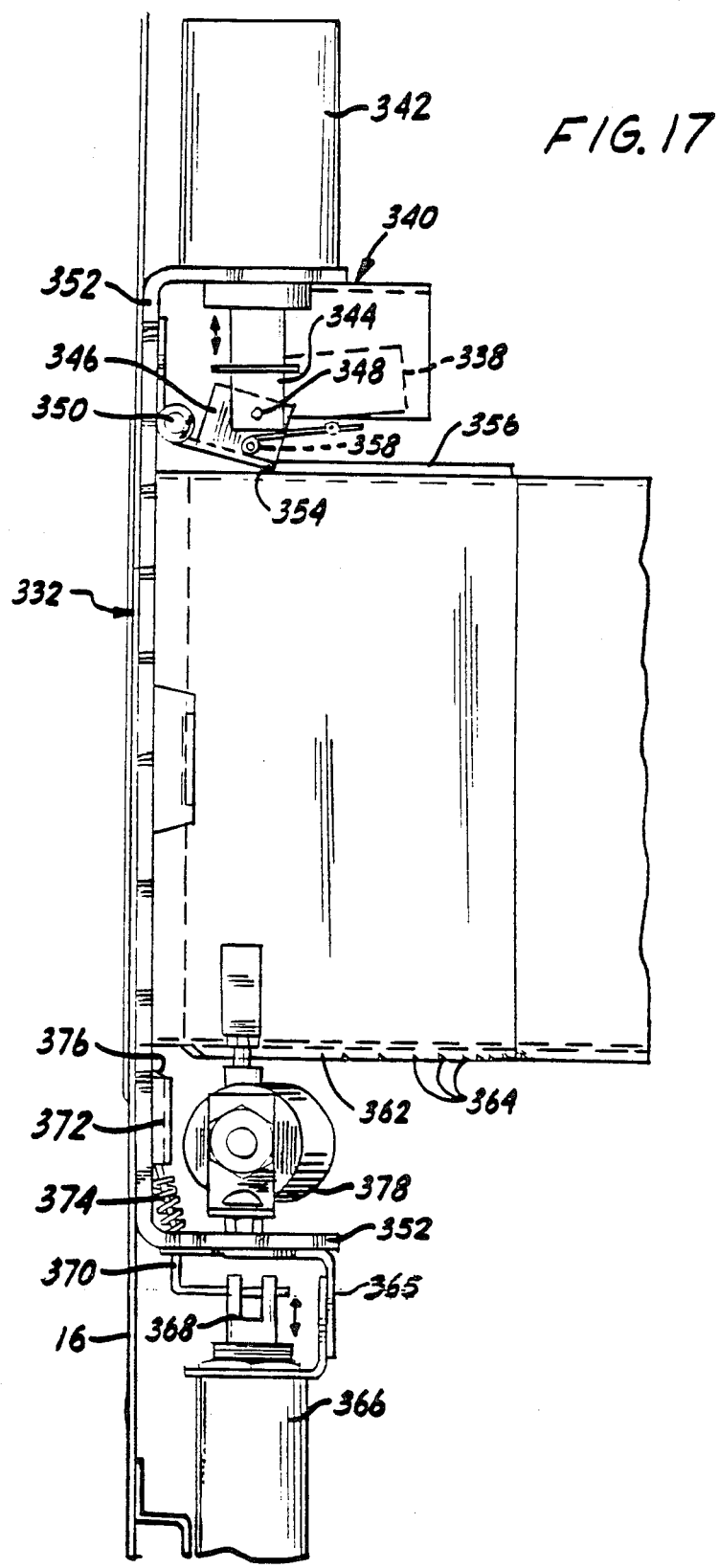
FIG. 17 is a right side elevational view, in partial cross-section, of the customer access door shown in FIG. 15.

Referring now to FIGS. 15, 16 and 17, there is disclosed the construction of an access door 332 in accordance with another embodiment of the present invention. The access door 332 operates, as previously described, to dispense a travel case 300 and its contained videocassette C to the customer and to accept returns of same from the customer at the end of the rental period. The access door 332 is generally located on a bridge behind door 16 and is maintained in a locked position by the CPU 38, except during dispensing and return operations. The side wall 324 of the receiving cavity 218 is provided with a limit switch 334, i.e., micro switch, having its trip lever 336 extending within the receiving cavity. The limit switch 334 provides a signal to the CPU 38 to indicate the presence of a travel case 300 being received within the receiving cavity 218. A second limit switch 338, i.e., micro switch, is provided as part of a door locking assembly 340, as shown in FIG. 17.

The door locking assembly 340 includes a door locking solenoid 342 having a reciprocating shaft 344 attached to a door locking member 346 by means of pin 348. The door locking member 346 is in turn pivotally attached about shaft 350 which is supported by the upper end of a bracker 352. Operation of door locking solenoid 342 will effect clockwise and counterclockwise pivoting of the door locking member 346 about shaft 350. The lower edge 354 of the door locking member 346 is shown in engagement, when in its fully rotated clockwise position, with the leading edge of a stop member 356 supported by the axis door 332. The limit switch 338 is provided with a trip lever 358 which is supported by a portion of the door locking member 346. The operation of the door locking assembly 340 will be described hereinafter.

Arranged underlying the access door 332, and supported by the lower end of the bracket 352 and door 16, is a door open holding assembly 360. The door open holding assembly 360 is constructed of a ratchet plate 362 having a plurality of teeth grooves 364. The ratchet plate 362 rotates about axis 208 and moves outwardly of door 16 in a similar manner as shown with respect to access door 28 in FIG. 13. A door open holding solenoid 366 is attached to bracket 352 and includes a reciprocal shaft 368 which is coupled to a bracket 370 which supports a plunger 372 which is upwardly biased by a compression spring 374. The plunger 372 is provided with a tip 376 constructed to be engaged with a groove 364 of the ratchet plate 362. In addition to the foregoing components, an air cylinder 378 attached to the access door 332 is provided to open and close the access door and to regulate the speed at which the access door opens and closes. The operation of the door open holding assembly will be described hereinafter.

The operation of the access door 332, in particular the door locking assembly 340 and door open holding assembly 360, and the dispensing of a videocassette C within a travel case 300 by means of the videocassette vending machine 10 will now be described. After the picker assembly 148 and transport means 100 have completed their vertical and horizontal movements to obtain the customer selected videocassette C from a selected storage location 50, 52, etc., and its travel case 300 has been engaged by the picker fingers 166 and 168 of the picker assembly, the picket assembly will return to its "home" position. The "home" position is that position where the picker assembly 148 is in vertical, horizontal and radial alignment with the receiving cavity 218. A notch can be provided to releasably engage the transport means 100 to ensure repeatable orientation when in the "home" position. Upon the completion of each selection and return operations, the picker assembly 148 will always return to this "home" position, directly aligned with the access door 332, and specifically the receiving cavity 218. When the picker assembly 148 is aligned with and stopped at the access door 332, the CPU 38 signals the picket assembly 148 to extend and release the travel case 300 into the dispensing cavity 218. When the travel case 300 is inserted into the receiving cavity 218, it actuates the limit switch 334 upon engagement with the protruding portion of the trip lever 336. The limit switch 334 signals the CPU 38 that the travel case 300 is in the receiving cavity 218 of the access door 332 and to retract the picker assembly 148 after separation of the picker fingers 166 and 168.

When the travel case 300 is received within the receiving cavity 218, a proximity switch (not shown) provided within the receiving cavity will indicate the proper orientation of the travel case and the videocassette C by sensing a piece of foil on the travel case. The travel case 300 must be oriented properly, so that the travel case bar code 328 and videocassette bar code 330 can be read by scanner 30. If the travel case 300 and contained videocassette C are oriented properly, the travel cassette bar code 328 and videocassette bar code 330 will be read by the scanner 30 as the travel case is fully described, the scanner 30 will first read the travel case bar code 328 on the travel case 300 which will indicate the particular videocassette vending machine number located at that particular site. Then, the scanner 30 will read the videocassette bar code 330 on the videocassette C to identify the specific videocassette vended. Each videocassette C will have a specific bar code for identification purposes. This identification information will include, for example, videocassette renting machine number, purchase or rental number, title number, tape copy number, etc. This information will then be printed by the printer 26 and the data stored in memory 34 by means of the CPU 38.

As thus far described, when the travel ase 300 and its contained videocassette C is fully received within the receiving cavity 218, the access door 332 is fully closed and in a locked condition. When the limit switch 334 signals CPU 38 that the travel case 300 have been received, and subsequent to the scanning of the travel case bar code 328 and videocassette bar code 330 by the scanner 30, the CPU will energize the door locking assembly 340. A signal will be sent to the solenoid 342 which normally has its shaft 344 in an extended position hich corresponds to a door lock position. As solenoid 342 is energized, its shaft 344 will be retracted upwardly to rotate door locking member 346 counterclockwise about shaft 350. This counterclockwise rotation of the door locking member 346 will disengage its lower edge 354 from the stop member 356. As the door locking member 346 rotates upwardly in a counterclockwise direction, it will actuate the limit switch 338 by engagement with the trip lever 358. This signals the CPU 38 that the access door 332 has been unlocked and is being opened by means of air cylinder 378.

As the access door 332 is swung open about shaft 386, the ratchet plate will also swing outwardly causing the tip 376 of the spring biased plunger 372 to successively engage the grooves 364 of the ratchet plate 362. Due to the wedge-shaped contruction of the grooves 364, the tip 376 of the plunger 372 will successively move into engagement with adjacent grooves as the access door 332 is further opened. However, this engagement will also prevent the access door 332 from being closed until operation of the door open holding assembly 360 as to be described hereinafter. As the access door 332 fully opens, the cylinder 378 has been regulating the speed at which the access door opens to ensure engagement of the tip 376 of the plunger 372 within each successive groove 364 of the ratchet plate 362. After the travel case 300 and its contained videocassette C is removed from the receiving cavity 218 of the access door 332, the access door will close. As the travel case 300 is removed from the receiving cavity 218, the limit switch 334, by means of trip lever 336 senses the removal of the travel case. The limit switch 334 will signal solenoid 336 of the door open holding assembly 360 to withdraw shaft 368 so as to disengage tip 376 of the plunger 372 from within its locked and engaged position within a groove 364 of the ratchet plate 362. At this time, the air cylinder 378 is activated for closing the access door 332 at a controlled and smooth speed.

When the access door 332 is in its fully closed position, a limit switch (not shown) will sense this condition and activate solenoid 342 of the door locking assembly 340 so as to extend shaft 344 downwardly thereby rotating door locking member 346 clockwise about shaft 350. This rotation of the door locking member 346 will result in its lower edge 354 engaging the stop member 356 so as to lock the access door 322 in a closed position. Once the door locking member 346 is in its locked position, the limit switch 338 will signal the CPU 38 that the access door 332 is closed and locked.

The return of a travel case 300 and its contained videocassette C to the videocassette vending machine 10 via access door 332 will now be described. In returning a travel case 300 and its contained videocassette C to the videocassette vending machine 10, the use of the mode select switches 20 and key pad 22 will enable the customer to open the access door 332 under the controlled operation of the air cylinder 378, door locking assembly 340 and door open holding assembly 360. In addition, the CRT display 24 will inform the customer that the access door 332 may be opened and the travel case 300 may be inserted within the receiving cavity 218. As the access door 332 is opened, subsequent to the activation of solenoid 342 and the disengaging of the lower edge 354 of the door locking member 346 from the stop member 356, the access door will lock in its open position. The locking of the access door 332 is achieved by means of the tip 376 of the plunger 372 engaging a particular groove 364 of the ratchet plate 362.

The customer will insert the travel case 300 and its contained videocassette C into the receiving cavity 218. At this time, the bar code scanner 30 will identify the travel case 300 by reading the travel case bar code 328 and determine if the travel case was rented from that particular videocassette vending machine 10. If the travel case 300 was rented from that particular videocassette vending machine 10, a signal will be sent to the CPU 38 to close the access door 332. The CPU 38 will signal the solenoid 366 so as to withdraw shaft 368 downwardly in a manner which will withdrawn tip 376 of the plunger 372 from within its engaged position within a groove 364 of the ratchet plate 362. In addition, the CPU 38 will signal the air cylinder 378 to begin closing of the access door 332.

If the return travel case 300 was not rented from that particular videocassette vending machine 10, the CRT display 24 will uniform the customer to remove the travel case from the receiving cavity 218 of the access door 332 while the access door is still open. The access door 332 is held in its open position by means of the plunger 372 and its engagement with the ratchet plate 362. Upon removal of the travel case 300, such removal is sensed by limit switch 334 which will signal the CPU 38 as to the removal of the travel case. The CPU 38 will activate the air cylinder 378 to close the access door 332 after activating the door open holding assembly 360, and particularly solenoid 366. The acceptance of a travel case 300 by the videocassette vending machine 10, vis-a-vis correct identification of the travel case bar code 328 by means of the scanner 30 will operate as previously described with respect to the embodiment illustrated in FIG. 13.

Thus, it can be appreciated that the foregoing embodiment precludes the acceptance of unauthorized travel cases 300 emanating from a different videocassette vending machine 10 or those which are obtained from unauthorized sources, such as video stores and commercial purchase. The failure of the scanner 30 to acknowledge an acceptable travel case 300 upon reading the travel case bar code 338, will result in the videocassette transport means 100 and picker assembly 148 remaining inoperative. At such time, the videocassette vending machine 10 will prompt the customer, via CRT display 24, that the travel case 300 was not obtained from this particular videocassette vending machine 10 and that the customer should return the travel case and its contents to the particular machine which that travel case came from.

In the event the travel case 300 is accepted into the videocassette vending machine 10, the scanner 30 will then scan the videocassette bar code 330 to determine whether the videocassette C was rented from that particular machine, and if so, the travel case 300 and its contents would be replaced for re-rental and the customer provided with a proper credit to cancel the security deposit charged. If the scanning of the videocassette bar code 330 on the videocassette C reveals that the videocassette C was not rented from that particular machine or no videocassette is present, the travel case 300 and its contents would be removed from the receiving cavity 218 by means of the transport means 100 and picker assembly 148 and placed in storage to prevent re-rental. The customer would then be advised by the CRT display 24 that the return was not the videocassette rented from that particular machine and the customer would be given a telephone number to call in which the matter could be further discussed. In other words, the customer would not receive any credit towards the security deposit charged at the time of rental.

Referring now to FIGS. 18 and 19, there is disclosed another embodiment of an access door 388 in accordance with the present inventiion. The access door 388 is provided within a recess 390 extending within door 16. The rear wall 392 defining the recess 390 is provided with the CRT display 24. Forward of the rear wall 392 and adjacent side wall 394, there is provided a C-shaped bracket 396 which defines a receiving cavity 398 for accepting a travel case 300. The rear of the receiving cavity 398, in general alignment with rear wall 392, is closed by an openable sliding door 400. Adjacent the door 400 within side wall 394 is a bar code scanner 30.

Behind rear wall 392 there is provided a second C-shaped bracket 402 defining a second receiving cavity 404 arranged in longitudinal alignment with the receiving cavity 398 defined by C-shaped bracket 396. A side wall 406 defining the receiving cavity 404 is also provided with a bar code scanner 30. A set of written instructions 408 may be provided on the door 16, for example, as follows:

TO RETURN
1. ONLY RENTALS FROM THIS MACHINE WILL BE ACCEPTED AND CREDITED TO YOUR ACCOUNT.
2. ENTER CREDIT CARD.
3. PRESS RETURN.
4. INSERT CASE WITH MOVIE INTO MACHINE AS SHOWN—PUSH UNTIL STOPPED.
5. IF CASE IS NOT ACCEPTED FROM MACHINE, PLEASE REMOVE AND SPEAK TO ATTENDANT.

The return of a travel case 300 containing a videocassette C to the videocassette vending machine 10 is accomplished in the following manner. The customer initially inserts his credit card, club card, or the like into the card reader 18 as previously described. The customer is then informed by the CRT display 24 to press the return mode selection switch 20 in order to activate the videocassette vending machine 10 via CPU 38 so as to enable return of the rented videocassette. Upon the customer pressing the return mode selection switch 20, the CRT display 24 will display a message to inform the customer to insert the travel case 300 into the receiving cavity 398. Optionally, the instructions provided the customer may be contained within the written instructions 408. As the customer inserts the travel case 300 into the receiving cavity 398, the scanner 30 will read the travel case bar code 328 through the window 302. Further insertion of the travel case 300 is precluded by the door 400 being closed.

If the travel case 300 has been properly identified by the scanner 30, i.e., as being rented from that particular videocassette vending machine 10, the CPU 38 will signal the door 400 to open. If the travel case 300 has not been identified as having been vended from that particular videocassette vending machine 10, the machine will remain inactive and the customer will be prompted either by the written instructions 408 or the CRT display 24 of this fact and be requested to remove the travel case from the receiving cavity 398. In other words, the videocassette vending machine 10 will not reject the travel case 300 as being unacceptable, rather, the machine merely remains inactive and does not begin its programmed operation, i.e., opening of door 400 and activation of videocassette transport means 100 and videocassette picker assembly 148.

Upon the scanner 30 detecting an authorized travel case 300, the CPU 38 will open door 400 and allow the travel case 300 to be further inserted into the videocassette vending machine 10 in the direction of arrow 412. At this time, the CPU 38 will activate the transfer means 100 and picker assembly 148 for ultimate removal of the travel case 300 from the receiving cavity 404 and its storage into the next available storage location 50, 52, etc. within the videocassette storage means 40.

As the travel case 300 passes through receiving cavity 404, scanner 30 will read the videocassette bar code 330 through window 302. If the CPU 38 acknowledges the bar code reading of the videocassette C to be the particular movie rented from that particular videocassette vending machine 10, the CPU 38 will instruct the picket assembly 148, as previously described, to place the travel case 300 with the contained videocassette C in the next closest available videocassette storage location 50, 52, etc. provided in the storage means 40 for further re-rental. The customer would receive proper credit for the security deposit he was previously charged when renting the videocassette. Simultaneously, the inventory table and other records are updated to reflect return of the videocassette C.

In the event the CPU 38 identifies the videocassette C as being different from the particular one rented, or determines that no videocassette is within the travel case 300, the travel case with its contents or lack of contents, would be placed in a storage area by means of the picker assembly 148 so as to prohibit further re-rental. The customer would then be informed on the CRT display 24 that the videocassette returned was not recognized as that which was rented and the customer would be instructed to call a particular telephone number to arrange proper credit for the security deposit paid.

The renting or purchasing of a videocassette C from the videocassette vending machine 10 will now be described. After selecting the particular videocassette C to be rented or purchased, in the manner previously described, the videocassette transport means 100 and picker assembly 148 will be activated for removing the videocassette within its contained travel case 300 from its particular storage location 50, 52, etc. The picker finger 166, as shown in FIG. 7, is provided with a mating spline opening 410 which is adapted to engage spline 308 on the travel case 300. This construction provides a mechanical union between the picker finger 166 and the travel case 300 such that the travel case is engaged precisely in the identical manner and precisely in the same way time after time by the picker assembly 148. This assures proper registration of the travel case 300 for insertion within a particular storage location 50, 52, etc. or within a receiving cavity of an access door of any one of the previously described embodiments. When the travel case 300 is inserted within receiving cavity 404, a limit switch (not shown) or other means will activate opening of door 400 to allow the travel case to be pushed outwardly into receiving cavity 398 where it can be retrieved by the customer. The customer may then grab the travel case 300 for complete withdrawal from the access door 388. As the travel case 300 passes door 400, an additional limit switch (not shown) or other means will signal the CPU 38 of the completed transaction and door 400 will close.

From the foregoing description of the videocassette vending machine 10, its construction is such to permit return of videocassettes C being contained within a travel case 300 which has been vended only from a particular machine. Thus, travel cases 300 from unauthorized videocassette vending machine 10 or from commercial sources such as video stores will not be accepted. The acceptance of a travel case 300 is independent of its contents and whether its contents, e.g., videocassette, is the particular videocassette which was actually rented from that particular machine. In the event the videocassette vending machine 10, via scanner 30, determines that the travel case 300 is not an authorized travel case, the machine will remain inactive and inoperative, necessitating that the cusftomer remove the travel cas and seek proper credit by requesting service. On the other hand, the identification of an acceptable travel case 300 will result in the travel case being received by the particular videocassette vending machine 10, regardless of its contents or lack of contents. A second scanner 30 will determine whether the contained videocassette C is the particular movie rented from that particular machine. If so, the travel case 300 and its contents will be re-shelved into the closet available videocassette storage location 50, 52, etc. and the CPU 38 will update this information into the memory 34 such that the movie can be re-rented. In the alternative, if the video cassette C is not recognized as having been rented from that particular videocassette vending machine 10, the travel case 300 and its contents will be placed in a storage area within the machine so as to prevent its re-rental. The customer would then be advised of this situation and requested to seek service for proper credit. Thus, in all cases, the return of a videocassette C to a particular videocassette vending machine 10 is not dependent upon the nature of the videocassette, but rather upon its travel case 300 having been vended from that particular machine.

As thus far described, the videocassette vending machine 10, in the event the CPU 38 recognizes the videocassette C as being different than the particular one rented, or determines that no videocassette C is within the travel case 300, the travel case with its contents, or lack of contents, would be placed in a storage area by means of the picker assembly 148 so as to prohibit further re-rental. The storage area for the unauthorized videocssette C within its travel case 300 would be any one of the storage locations 50, 52, etc. within the storage means 40. In particular, the storage location would be any empty available storage location closest to the home position of the picker assembly 148 as previously described. The closest available storage position is chosen so as to minimize transport means cycling time. The CPU 38 would update the inventory table and other records contained within the memory unit 34 so as to identify the coordinates of that storage location and to identify that particular videocassette C as being unavailable for further purchaser or rental. Thus, the storage of an unacceptable videocassette C for further purchase or rental may be within one of the storage locations 50, 52 within the storage means 40 or, if desired, within another location with the videocassette vending machine 10. In the case where the unacceptable videocassette C is returned to the storage means 40, its location and identity as being unacceptable for further puchase or rental is programmed into the memory unit 34 by means of the CPU 38.

The videocassette vending machine 10, as thus far described, can be programmed for a variety of operations and to take into consideration a variety of transactions to be completed. When a videocassette C is returned to the videocassette vending machine 10 from which it was dispensed, the customer receives credit for his security deposit and the rental charge is automatically debited to his credit card. The CPU 38 may be programmed to require rented videocassettes C to be returned within a particular number of days, e.g., seven days. In the event the particular videocassette C being rented is not returned within the designated period, the CPU 38 will automatically charge the customer's credit card with the purchase value for the videocassette previously rented. In the event the videocassette C is ultimately returned, the CPU 38 can effect appropriate crediting to the customer's account. Alternatively, the customer can be prompted by CRT display 24 to seek service in order to obtain proper credit.

In the thus far described operation of the videocassette vending machine 10, the customer's credit card number, club card number or the like is held within the memory unit 34 by means of the operation of CPU 38. The holding of the customer's credit card number is, in effect, considered to be a security deposit, as the customer can now be charged for the purchase or rental of the selected videocassette at any time, as long as such number remains within the memory unit 34. The CPU 38 assumes that the selected videocassette when being removed from the videocassette vending machine 10 for rental is to be a purchase unless the selected videocassette is returned within the predetermined number of days. If the selected videocassette C is returned within that designated period, the CPU will charge the customer's credit card as a rental for the particular number of days actually rented. On the other hand, if the selected videocassette C is not returned within the designated period, the customer's credit card is automatically charged as a purchase of that particular videocassette.

Although the present invention has been described with particular applicability to the vending of videocassettes C, it is to be understood that other products and items may be vended in a similar manner. For example, it is contemplated that the vending machine can be used for the purchase of and/or the development of photographic film. A customer may purchase a particular type of photographic film from the vending machine in the manner as thus far described for the purchase of a selected k videocassette C. When that customer, or any customer, desires to have the film developed, even if purchased elsewhere, he would return the film to any vending machine in a similar manner as previously described with respect to the return of a videocassette C. However, each of the storage locations 50, 52 would contain a film protective case functionally similar to the travel case 300 as previously described with respect to videocassettes C. The customer would remove the protective case and would find inside an application and written instructions for developing the particular film being deposited. The customer would complete the necessary information, returning the completed form and the film to be developed within the protective case. The protective case would be returned through the access door 28 into the receiving cavity 218 to be returned to the storage means 40 in a similar manner as previously described with respect to videocassettes C. The customer would be given a receipt which would indicate the transaction and the particular location of his film within the vending machine.

At a subsequent time, an operator would open the vending machine to remove all film from each of the storage locations 50, 52 and record the particular location of each film being removed. Once the film has been developed, for example at a custom lab, the operator would return the developed film to the protective case within the exact storage location 50, 52 from which it was removed. After a designated number of days, the customer would return to the same vending machine and access the particular storage location 50, 52 to remove the developed film and the contents of the protective case. The operation of the vending machine would be controlled by the CPU 38 in conjunction with the memory unit 34. In this regard, the customer may use his credit card, club card or the like, including cash, in which to pay for the developed film.

From the foregoing description, it should be understood that the vending machine is one with multiple purposes and could be used for dispensing other products with or without a protective or travel caase. In other words, the present invention may be embodied in other specific forms and be adapted for vending other products, all without departing from the spirit and essential attributes of the present invention and, accordingly, reference should be made to the foregoing specification as indicating the scope of the invention.

What is claimed is:

1. Apparatus for selectably vending articles, said apparatus comprising storage means for storing a plurality of articles in identifiable locations, mode selection means for enabling operation of said apparatus among a purchase mode or a rent mode and a return mode, article selection means for enabling selection of a desired article in the purchase mode or rent mode, access means for dispensing the selected article in the purchase mode or rent mode and receiving an article in the return mode, and transport means for transporting the selected article from the storage means to the access means in the purchase mode or rent mode and transporting the article from the access means to the closest available empty location proximate said access means in the storage means in the return mode.

2. The apparatus of claim 1, further including identification means adjacent said access means for receiving information representative of the identity of the article being returned in the return mode.

3. The apparatus of claim 2, further including memory means for storing information about the selected article, the coordinates of the articles within the storage means and available empty locations in the storage means.

4. The apparatus of claim 3, further including control means coupled to the mode selection means, the article selection means, the identification means, the transport means, and the memory means for receiving information about the selected article, said control means causing the transport means to transport a selected article from the storage means to the access means and causing the information in the memory means representative of the locations of articles in the storage means to be altered to indicate removal of the selected article from its location in the storage means, all when in thepurchase mode or rent mode, and causing the transport means to transport a returned article from the access means to any available empty location in the storage means and causing information in the memory means representative of the locations of articles in the storage means to be altered to indicate the placement of the returned article in the available empty location, all when in the return mode.

5. The apparatus of claim 3, further including means for causing the transport means to automatically generate calibration signals representative of movement of the transport means in two coordinates and for automatically storing the calibration signals in the memory means.

6. The apparatus of claim 1, further including first keying means associated wit the article for uniquely keying the videocassette to the apparatus in the return mode.

7. The apparatus of claim 6, further including second keying means operatively associated with the access means for mating with the first keying means for permitting operation of the access means only when the first keying means mates with the second keying means.

8. The apparatus of claim 1, wherein the storage means comprises a plurality of individual storage locations, each definable by cylindrical coordinates.

9. The apparatus of claim 1, wherein the transport means comprises first means pivotable about an axis, second means pivotable with said first means linearly movable along the axis and third means linearly movable along the axis with the second means for reciprocal movement toward and away from the axis.

10. The apparatus of claim 9, further including means for moving the first means, second means and third means to any of a plurality of locations definable by cylindrical coordinates.

11. The apparatus of claim 1, wherein the access means includes means thereon for preventing insertion of objects other than articles into the interior of the apparatus.

12. The apparatus of claim 3, further including means operatively associated with the identification means in the return mode for causing articles unacceptable for return to be placed in a discrete location in the storage means and for causing the coordinates of that discrete location to be entered into the memory means along with information identifying that discrete location as containing an article not available for purchase or rental.

13. The apparatus of claim 1, wherein the access means includes means movable between open and closed positions and having article receiving means being in alignment with the transport means when in the closed position and being manually accessible by a customer when in the open position.

14. The apparatus of claim 13, further including first locking means associated with the access means for permitting movement of the access means between the closed and opened positions only when a article is to be dispensed in the purchase mode or rent mode or received in the return mode.

15. The apparatus of claim 14, further including second locking means associated with the access means for preventing closing of the access means when in the opened position when a article is to be dispensed in the purchase mode or rent mode or received in the return mode.

16. The apparatus of claim 15, wherein said second locking means includes a ratchet plate having a plurality of grooves and means for releasably engaging selective ones of said grooves.

17. The apparatus of claim 1, wherein the storage means comprises a portion of the surface of a cylinder, the storage means having a plurality of radially-spaced dividing walls extending parallel to the axis of the cylinder, the dividing walls having means for receiving therein a plurality of axially-spaced shelves arranged to lie substantially in axially-spaced planes perpendicular to the axis of the cylinder, the walls and shelves defining discrete, identifiable storage locations therebetween.

18. The apparatus of claim 17, wherein the walls are provided with resilient means for releasably retaining articles in the storage locations, said resilient means formed integral with the walls.

19. Apparatus for selectably vending articles in a protective case, said apparatus comprising storage means for storing a plurality of articles each within a protective case in identifiable locations, mode selection means for enabling operation of said apparatus among a purchase mode or a rent mode and a return mode, article selection means for enabling selection of a desired article in the purchase mode or rent mode, access means for dispensing the selected article with its protective case in the purchase mode or rent mode and receiving the article within its protective case in the return mode, protective case identification means for receiving information representative of the identity of the protective case being returned in the return mode, and transport means for transporting the selected article within its protective case from the storage means to the access means in the purchase mode or rent mode and transporting the protective case and its contents from the access means to an empty location in the storage means in the return mode in response to the identification means receiving predetermined information with respect to the identity of the protective case, the protective case remaining in the access means in the absence of the identification means receiving said predetermined information.

20. The apparatus of claim 19, further including memory means for storing information about the selected article and its protective case, the coordinates of the articles within the storage means and available empty locations in the storage means.

21. The apparatus of claim 20, further including means for automatically placing articles within their protective case to be sftored in any available empty location in the storage means and for automatically storing in the memory means information representative of the stored article and its corresponding location in the storage means.

22. The apparatus of claim 20, further including mean for causing the transport means to automatically generate calibration signals representative of movement of the transport means in two coordinates and for automatically storing the calibration signals in the memory means.

23. The apparatus of claim 19, further including first keying means associated with the protective cases for uniquely keying the protective cases to the access means in the return mode.

24. The apparatus of claim 23, further including second keying means operatively associated with the access means for mating with the first keying means for permitting operation of the apparatus only when the first keying means mates with the second keying means.

25. The apparatus of claim 19, wherein the transport means comprises first means pivotable about an axis, second means pivotable with said first means linearly movable along the axis and third means linearly movable along the axis with the second means for reciprocal movement toward and away from the axis, and means for moving the first means, second means and third means to any of a plurality of locations definable by cylindrical coordinates.

26. The apparatus of claim 19, wherein the access means includes means movable between open and closed positions and having protective case receiving means being in alignment with the transport means when in the closed position and being manually accessible by a customer when in the open position.

27. The apparatus of claim 19, further including first locking means associated with the access means for permitting movement of the access means between closed and opened positions only when a article within its protective case is to be dispensed in the purchase mode or rent mode or received in the return mode, and second locking means associated with the access means for preventing closing of the access means when in an opened position when an article within its protective case is to be dispensed in the purchase mode or rent mode or received in the return mode.

28. The apparatus of claim 27, wherein the second locking means includes a ratchet plate having a plurality of grooves and means for releasably engaging selective ones of said grooves.

29. The apparatus of claim 19, wherein the storage means comprises a portion of the surface of a cylinder, the storage means having a plurality of radially-spaced dividing walls extending parallel to the axis of the cylinder, the dividing walls having means for receiving therein a plurality of axially-spaced shelves arranged to lie substantially in axially-spacedplanes perpendicular to the axis of the cylinder, the walls and shelves defining discrete, identificable storage locations therebetween.

30. The apparatus of claim 19, further including article identification means for receiving information representative of the identity of the article being returned in the return mode.

31. The apparatus of claim 30, further including means operatively associated wit the article identification means in the return mode for causing an article unacceptable for return to be placed with its protective case in a discrete locatin in the storage means and for causing the coordinates of that discrete location to be entered into the memory means along with information identifying that discrete location as containing an article not available for further purchase or rental.

32. The apparatus of claim 30, wherein the article identification means and the protective case identification means are located adjacent the access means.

33. The apparatus of claim 32, wherein the protective case includes a transparent window providing access to the information representative of the identity of the article and the protective case.

34. The apparatus of claim 19, wherein the access means includes a pair of spaced-apart receiving cavities, and a closure member positionable therebetween so as to selectively prevent communication between the receiving cavities.

35. The apparatus of claim 19, wherein the transport means includes means for engaging a spline on the protective case so as to provide predetermined registration therebetween.

36. Method for selectably vending articles from an apparatus comprising the steps of storing a plurality of articles in identifiable locations in a storage means, enabling selective operation of the apparatus among a purchase mode or a rent mode and a return mode, enabling selection of a desired article in the purchase mode or rent mode, dispensing the selected article in the purchase mode or rent mode and receiving an article in the return mode, and transporting the selected article from the storage means to a customer access means in the purchase mode or rent mode and transporting the article from the access means to the closest available empty location proximate said customer access means in the storage means in the return mode.

37. The method of claim 36, further including receiving information representative of the identity of the article being returned in the return mode by article identification means adjacent the customer access means.

38. The method of claim 37, further including storing information in memory means about the selected article, the coordinates of the articles within the storage means and available empty discrete locations in the storage means.

39. The method of claim 38, further including generating calibration signals representative of movement of articles from the storage means to the customer access means in two coordinates and storing the calibration signals in the memory means.

40. The method of claim 38, further including transporting the selected article from the storage means to the customer access means and causing the information in the memory means representative of the locations of articles in the storage means to be altered to indicate removal of the selected article from its location in the storage means, all when in the purchase mode or rent mode, and transporting the returned article from the customer access means to any available empty location in the storage means and causing information in the memory meand representative of the locations of articles in the storage means to be altered to indicate the placement of the returned article in the available empty location, all when in the return mode.

41. The method of claim 36, further including receiving information representative of the identify of an article being returned in the return mode, and preventing subsequent rental of the article in the absence of receiving predetermined information thereabout.

42. The method of claim 41, further including causing articles unacceptable for purchase or rental to be placed in a discrete location in the storage means and causing the coordinates of that discrete location to be entered into memory means along with information identifying that discrete location as containing a article not available for further purchase or rental.

43. The method of claim 36, further including permitting movement of the customer access means between closed and opened positions only when an article is to be dispensed in the purchase mode or rent mode or received in the return mode.

44. Method for selectably vending articles in a protective case from an apparatus comprising the steps of storing a plurality of articles each within a protective case in identifiable locations in a storage means, enabling selective operation of the apparatus among a purchase mode or a rent mode and a return mode, enabling selection of a desired article in the purchase mode or rent mode, dispensing the selected article with its protective case in the purchase mode or rent mode and receiving the article within its protective case in the return mode, receiving information representative of the identity of the protective case being returned in the return mode, and transporting the selected article within its protective case from the storage means to a customer access means in the purchase mode or rent mode and transporting the protective case and its contents from the access means to an empty location in the storage means in the return mode in response to receiving predetermined information with respect to the identity of said protective case, the protective case remaining in the access means in the absence of receiving the predetermined information.

45. The method of claim 44, further including receiving information representative of the identity of the article being returned in the return mode.

46. The method of claim 44, further including storing information in memory means about the selected article, the coordinates of the videocassette within its protective case within the storage means and available empty discrete locations in the storage means.

47. The method of claim 46, further including generating calibration signals representative of movement of articles from the storage means to the customer access means in two coordinates and for automatically storing the calibration signals in the memory means.

48. The method of claim 44, further including receiving information representative of the identity of the article being returned in the return mode, and transporting the article and its protective case to a first discrete location in the storage means for purchase or rental in response to receiving first predetermined information representative of the identity of the article.

49. The method of claim 48, further including transporting the article and its protective case to a second discrete location in the storage means to prevent purchase or rental in response to receiving second predetermined information representative of the identity of the article.

50. The method of claim 49, further including causing the coordinates of the first and second discrete locations to be entered into memory means.

51. The method of claim 44, further including establishing a predetermined period for return of a selected article when in the rental mode and charging a customer for the purchase of the selected article after the predetermined period in the absence of return of the selected article in the return mode.

52. Apparatus for selectably vending articles, said apparatus comprising storage means for storing a plurality of articles in identifiable locations, mode selection means for enabling operation of said apparatus among a delivery mode and a return mode, article selection means for enabling selection of a desired article in the delivery mode, access means for dispensing the selected article in the delivery mode and receiving an article in the return mode, and transport means for transporting the selected article from the storage means to the access means in the delivery mode and transporting the article from the access means to the closest available empty location proximate said access means in the storage means in the return mode.

53. Apparatus for selectably vending articles, said apparatus comprising storage means for storing a plurality of articles in identifiable locations, mode selection means for enabling operation of said apparatus among a purchase mode or a rent mode and a return mode, article selection means for enabling selection of a desired article in the purchase mode or rent mode, access means for dispensing the selected article in the purchase mode or rent mode and receiving an article in the return mode, transport means for transporting the selected article from the storage means to the access means in the purchase mode or rent mode and transporting the article from the access means to the closest available empty location in the storage means in the return mode, memory means for storing information about the selected article, the coordinates of the articles within the storage means and available empty locations in the storage means, and means operatively associated with the identification means in the return mode for causing articles unacceptable for return to be placed in a discrete location in the storage means and for causing the coordinates of that discrete location to be entered into the memory means along with information identifying that discrete location as containing an article not available for purchase or rental.

54. Apparatus for selectably vending articles, said apparatus comprising storage means for storing a plurality of articles in identifiable locations, mode selection means for enabling operation of said apparatus among a purchase mode or a rent mode and a return mode, article selection means for enabling selection of a desired article in the purchase mode or rent mode, access means for dispensing the selected article in the purchase mode or rent mode and receiving an article in the return mode, transport means for transporting the selected article from the storage means to the access means in the purchase mode or rent mode and transporting the article from the access means to any available empty location in the storage means in the return mode, said access means including means movable between open and closed positions and having article receiving means being in alignment with the transport means when in the closed position and being manually accessible by a customer when in the open position.

55. The apparatus of claim 54, further including first locking means associated with the access means for permitting movement of the access means between the closed and opened positions only when an article is to be dispensed in the purchase mode or rent mode or received in the return mode.

56. The apparatus of claim 55, further including second locking means associated with the access means for preventing closing of the access means when in the opened position when an article is to be dispensed in the purchase mode or rent mode or received in the return mode.

57. The apparatus of claim 56, wherein said second locking means includes a ratchet plate having a plurality of grooves and means for releasably engaging selective ones of said grooves.

58. Apparatus for selectably vending articles in a protective case, said apparatus comprising storage means for storing a plurality of articles each within a protective case in identifiable locations, mode selection means for enabling operation of said apparatus among a purchase mode or a rent mode and a return mode, article selection means for enabling selection of a desired article in the purchase mode or rent mode, access means for dispensing the selected article with its protective case in the purchase mode or rent mode and receiving the article within its protective case in the return mode, protective case identification means for receiving information representative of the identity of the protective case being returned in the return mode, transport means for transporting the selected article within its protective case from the storage means to the access means in the purchase mode or rent mode and transporting the protective case and its contents from the access means to an empty location in the storage means in the return mode in response to the identification means receiving predetermined information with respect to the identity of the protective case, the protective case remaining in the access means in the absence of the identification means receiving said predetermined information, and first keying means associated with the protective case for uniquely physically keying the protective case to the access means in the return mode.

59. The apparatus of claim 58, further including second keying means operatively associated with the access means for physically mating with the first keying means for permitting operation of the apparatus only when the first keying means mates with the second keying means.

60. Apparatus for selectably vending articles in a protective case, said apparatus comprising storage means for storing a plurality of articles each within a protective case in identifiable locations, mode selection means for enabling operation of said apparatus among a purchase mode or a rent mode and a return mode, article selection means for enabling selection of a desired article in the purchase mode or rent mode, access means for dispensing the selected article with its protective case in the purchase mode or rent mode and receiving the article within its protective case in the return mode, protective case identification means for receiving information representative of the identity of the protective case being returned in the return mode, transport means for transporting the selected article within its protective case from the storage means to the access means in the purchase mode or rent mode and transporting the protective case in its contents from the access means to an empty location in the storage means in the return mode in response to the identification means receiving predetermined information with respect to the identity of the protective case, the protective case remaining in the access means in the absence of the identification means receiving said predetermined information, first locking means associated with the access means for permitting movement of the access means between closed and opened positions only when an article within its protective case is to be dispensed in the purchase mode or rent mode or received in the return mode, and second locking means associated with the access means for preventing closing of the access means when in an opened position when an article within its protective case is to be dispensed in the purchase mode or rent mode or received in the return mode.

61. The apparatus of claim 60, wherein the second locking means includes ratchet plate having a plurality of grooves and means for releasably engaging selective ones of said grooves.

62. Apparatus for selectably vending articles in a protective case, said apparatus comprising storage means for storing a plurality of articles each within a protective case in identifiable locations, mode selection means for enabling operation of said apparatus among a purchase mode or a rent mode and a return mode, article selection means for enabling selection of a desired article in the purchase mode or rent mode, access means for dispensing the selected article with its protective case in the purchase mode or rent mode and receiving the article within its protective case in the return mode, protective case identification means for receiving information representative of the identity of the protective case being returned in the return mode, transport means for transporting the selected article within its protective case from the storage means to the access means in the purchase mode or rent mode and transporting the protective case and its contents from the access means to an empty location in the storage means in the return mode in response to the identification means receiving predetermined information with respect to the identity of the protective case, the protective case remaining in the access means in the absence of the identification means receiving said predetermined information, article identification means for receiving information representative of the identity of the article being returned in the return mode, and means operatively associated with the article identification means in the return mode for causing an article unacceptable for return to be placed with its protective case in a discrete location in the storage means and for causing the coordinates of that discrete location to be entered into the memory means along with information identifying that discrete location as containing an article not available for further purchase or rental.

63. Apparatus for selectably vending articles in a protective case, said apparatus comprising storage means for storing a plurality of articles each within a protective case in identifiable locations, mode selection means for enabling operation of said apparatus among a purchase mode or a rent mode and a return mode, article selection means for enabling selection of a desired article in the purchase mode or rent mode, access means for dispensing the selected article with its protective case in the purchase mode or rent mode and receiving the article within its protective case in the return mode, protective case identification means for receiving information representative of the identity of the protective case being returned in the return mode, transport means for transporting the selected article within its protective case from the storage means to the access means in the purchase mode or rent mode and transporting the protective case and its contents from the access means to an empty location in the storage means in the return mode in response to the identification means receiving predetermined information with respect to the identity of the protective case, the protective case remaining in the access means in the absence of the identification means receiving said predetermined information, said article identification means and said protective case identification means being located adjacent the access means, said protective case including a transparent window providing access to the information representative of the identity of the article and the protective case.

64. Apparatus for selectably vending articles in a protective case, said apparatus comprising storage means for storing a plurality of articles each within a protective case in identifiable locations, mode selection means for enabling operation of said apparatus among a purchase mode or a rent mode and a return mode, article selection means for enabling selection of a desired article in the purchase mode or rent mode, access means for dispensing the selected article with its protective case in the purchase mode or rent mode and receiving the article within its protective case in the return mode, protective case identification means for receiving information representative of the identity of the protective case being returned in the return mode, transport means for transporting the selected article within its protective case from the storage means to the access means in the purchase mode or rent mode and transporting the protective case and its contents from the access means to an empty location in the storage means in the return mode in response to the identification means receiving predetermined information with respect to the identity of the protective case, the protective case remaining in the access means in the absence of the identification means receiving said predetermined information, said access means including a pair of spaced-apart receiving cavities, and a closure member positionable therebetween so as to selectively prevent communication between the receiving cavities.

65. Apparatus for selectably vending articles in a protective case, said apparatus comprising storage means for storing a plurality of articles each within a protective case in identifiable locations, mode selection means for enabling operation of said apparatus among a purchase mode or a rent mode and a return mode, article selection means for enabling selection of a desired article in the purchase mode or rent mode, access means for dispensing the selected article with its protective case in the purchase mode or rent mode and receiving the article within its protective case in the return mode, protective case identification means for receiving information representative of the identity of the protective case being returned in the return mode, transport means for transporting the selected article within its protective case from the storage means to the access means in the purchase mode or rent mode and transporting the protective case and its contents from the access means to an empty location in the storage means in the return mode in response to the identification means receiving predetermined information with respect to the identity of the protective case, the protective case remaining in the access means in the absence of the identification means receiving said predetermined information, said transport means including means for engaging a spline on the protective case so as to provide predetermined registration therebetween.

66. Method for selectably vending articles from an apparatus comprising the steps of storing a plurality of articles in identifiable locations in a storage means, enabling selective operation of the apparatus among a purchase mode or a rent mode and a return mode, enabling selection of a desired article in the purchase mode or rent mode, dispensing the selected article in the purchase mode or rent mode and receiving an article in the return mode, transporting the selected article from the storage means to a customer access means in the purchase mode or rent mode and transporting the article from the access means to any available empty location in the storage means in the return mode, and receiving information representative of the identity of an article being returned in the return mode, and preventing subsequent rental of the article in the absence of receiving predetermined information thereabout.

67. The method of claim 66, further including causing articles unacceptable for purchase or rental to be placed in a discrete location in the storage means and causing the coordinates of that discrete location to be entered into memory means along with information identifying that discrete location as containing an article not available for further purchase or rental.

68. Method for selectably vending articles in a protective case from an apparatus comprising the steps of storing a plurality of articles each within a protective case in identifiable locations in a storage means, enabling selective operation of the apparatus among a purchase mode or a rent mode and a return mode, enabling selection of a desired article in the purchase mode or rent mode, dispensing the selected article with its protective case in the purchase mode or rent mode and receiving the article within its protective case in the return mode, receiving information representative of the identity of the protective case being returned in the return mode, transporting the selected article within its protective case from the storage means to a customer access means in the purchase mode or rent mode and transporting the protective case and its contents from the access means to an empty location in the storage means in the return mode in response to receiving predetermined information with respect to the identity of said protective case, the protective case remaining in the access means in the absence of receiving the predetermined information, receiving information representative of the identity of the article being returned in the return mode, and transporting the article and its protective case to a first discrete location in the storage means for purchase or rental in response to receiving first predetermined information representative of the identity of the article, and transporting the article and its protective case to a second discrete location in the storage means to prevent purchase or rental in response to receiving second predetermined information representative of the identity of the article.

69. The method of claim 68, further including causing the coordinates of the first and second discrete locations to be entered into memory means.

70. The apparatus of claim 1, wherein said article comprises a videocassette.

71. The apparatus of claim 19, wherein said article comprises a videocassette.

72. The method of claim 36, wherein said article comprises a videocassette.

73. The method of claim 44, wherein said article comprises a videocassette.

74. The apparatus of claim 52, wherein said article comprises a videocassette.

75. The apparatus of clai 53, wherein said article comprises a videocassette.

76. The apparatus of claim 54, wherein said article comprises a videocassette.

77. The apparatus of claim 58, wherein said article comprises a videocassette.

78. The apparatus of claim 60, wherein said article comprises a videocassette.

79. The apparatus of claim 62, wherein said article comprises a videocassette.

80. The apparatus of claim 63, wherein said article comprises a videocassette.

81. The apparatus of claim 64, wherein said article comprises a videocassette.

82. The apparatus of claim 65, wherein said article comprises a videocassette.

83. The apparatus of claim 66, wherein said article comprises a videocassette.

84. The method of claim 68, wherein said article comprises a videocassette.

* * * * *

UNITED STATES PATENT AND TRADEMARK OFFICE
CERTIFICATE OF CORRECTION

PATENT NO. : 4,839,505

DATED : June 13, 1989

INVENTOR(S) : Bradt et al.

It is certified that error appears in the above-identified patent and that said Letters Patent is hereby corrected as shown below:

Column 8, line 65, "aluminu" should read --aluminum--.
Column 12, line 66, after "error" insert --log--.
Column 12, line 17, "jeep" should read --keep--.
Column 13, line 48, "36Z" should read --36--.
Column 13, line 65, "39" should read --38--.
Column 16, line 22, "figner" should read --finger--.
Column 16, line 30, "160" should read --190--.
Column 19, line 9, "transition" should read --transaction--.
Column 20, line 37, "shft" should read --shaft--.
Column 22, line 46, "402" should read --302--.
Column 25, line 34, "of" should read --to--.
Column 26, line 55, "bracker" should read --bracket--.

Column 27, line 27, "picket" should read --picker--.
Column 27, line 39, "picket" should read --picker--.
Column 28, line 45, "336" should read --366--.
Column 29, line 32, "uniform" should read --inform--.
Column 35, line 23, "wit" should read --with--.
Column 35, line 24, "videocassette" should read --article--.
Column 36, line 19, "identificable" should read --identifiable--.
Column 36, line 56, "sftored" should read --stored--.
Column 37, line 46, "identificable" should read --identifiable--.

UNITED STATES PATENT AND TRADEMARK OFFICE
CERTIFICATE OF CORRECTION

PATENT NO. : 4,839,505

DATED : June 13, 1989

INVENTOR(S) : Bradt et al.

It is certified that error appears in the above-identified patent and that said Letters Patent is hereby corrected as shown below:

Column 37, line 52, "wit" should read --with--.
Column 38, line 48, "meand" should read --means--.
Column 38, line 53, "identify" should read --identity--.
Column 41, line 46, "in" should read --and--.
Column 44, line 64, "apparatus" should read --method--.

Signed and Sealed this

Twenty-ninth Day of May, 1990

Attest:

HARRY F. MANBECK, JR.

*Attesting Officer*       Commissioner of Patents and Trademarks